(12) United States Patent
Yano

(10) Patent No.: US 6,519,621 B1
(45) Date of Patent: Feb. 11, 2003

(54) ARITHMETIC CIRCUIT FOR ACCUMULATIVE OPERATION

(75) Inventor: Naoka Yano, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/307,808

(22) Filed: May 10, 1999

(30) Foreign Application Priority Data

May 8, 1998 (JP) .......................................... 10-126426

(51) Int. Cl.[7] .............................. G06F 7/00; G06F 7/50
(52) U.S. Cl. ...................................... 708/603; 708/709
(58) Field of Search ................................. 708/501, 503, 708/523, 603, 620, 625, 626, 627, 628, 629, 630, 631, 632, 708

(56) References Cited

U.S. PATENT DOCUMENTS

| | | | | |
|---|---|---|---|---|
| 3,515,344 A | * | 6/1970 | Goldschmidt et al. | 708/708 |
| 5,220,525 A | * | 6/1993 | Anderson et al. | 708/631 |
| 5,675,527 A | | 10/1997 | Yano | |
| 5,784,305 A | * | 7/1998 | Nadehara | 708/523 |
| 5,847,981 A | | 12/1998 | Kelly et al. | |

* cited by examiner

Primary Examiner—Chuong Dinh Ngo
(74) Attorney, Agent, or Firm—Oblon, Spivak, McClelland, Maier & Neustadt, P.C.

(57) ABSTRACT

An improved arithmetic circuit for accumulative operation for use in digital signal processors, microprocessors and so forth is described, in which the pipelined control becomes effective during accumulative operation by eliminating idling stages in the pipeline structure. In accordance with the improved arithmetic circuit, during accumulative operation, the next operation is initiated with intermediate results of the current operation while the current operation is being executed and not yet completed so that it is possible to improve the speed of accumulative operation and reduce the scale of integration.

24 Claims, 11 Drawing Sheets

| a | b | c | d | Ci | S | C | Co |
|---|---|---|---|---|---|---|---|
| 0 | 0 | 0 | 0 | 0 | 0 | 0 | 0 |
| 0 | 0 | 0 | 0 | 1 | 1 | 0 | 0 |
| 0 | 0 | 0 | 1 | 0 | 1 | 0 | 0 |
| 0 | 0 | 0 | 1 | 1 | 0 | 0 | 1 |
| 0 | 0 | 1 | 0 | 0 | 1 | 0 | 0 |
| 0 | 0 | 1 | 0 | 1 | 0 | 0 | 1 |
| 0 | 0 | 1 | 1 | 0 | 0 | 0 | 1 |
| 0 | 0 | 1 | 1 | 1 | 1 | 0 | 1 |
| 0 | 1 | 0 | 0 | 0 | 1 | 0 | 0 |
| 0 | 1 | 0 | 0 | 1 | 0 | 0 | 1 |
| 0 | 1 | 0 | 1 | 0 | 0 | 0 | 1 |
| 0 | 1 | 0 | 1 | 1 | 1 | 0 | 1 |
| 0 | 1 | 1 | 0 | 0 | 0 | 1 | 0 |
| 0 | 1 | 1 | 0 | 1 | 1 | 1 | 0 |
| 0 | 1 | 1 | 1 | 0 | 1 | 1 | 0 |
| 0 | 1 | 1 | 1 | 1 | 0 | 1 | 1 |
| 1 | 0 | 0 | 0 | 0 | 1 | 0 | 0 |
| 1 | 0 | 0 | 0 | 1 | 0 | 0 | 1 |
| 1 | 0 | 0 | 1 | 0 | 0 | 0 | 1 |
| 1 | 0 | 0 | 1 | 1 | 1 | 0 | 1 |
| 1 | 0 | 1 | 0 | 0 | 0 | 1 | 0 |
| 1 | 0 | 1 | 0 | 1 | 1 | 1 | 0 |
| 1 | 0 | 1 | 1 | 0 | 1 | 1 | 0 |
| 1 | 0 | 1 | 1 | 1 | 0 | 1 | 1 |
| 1 | 1 | 0 | 0 | 0 | 0 | 1 | 0 |
| 1 | 1 | 0 | 0 | 1 | 1 | 1 | 0 |
| 1 | 1 | 0 | 1 | 0 | 1 | 1 | 0 |
| 1 | 1 | 0 | 1 | 1 | 0 | 1 | 1 |
| 1 | 1 | 1 | 0 | 0 | 1 | 1 | 0 |
| 1 | 1 | 1 | 0 | 1 | 0 | 1 | 1 |
| 1 | 1 | 1 | 1 | 0 | 0 | 1 | 1 |
| 1 | 1 | 1 | 1 | 1 | 1 | 1 | 1 |

INPUT    OUTPUT

ARITHMETIC CIRCUIT FOR ACCUMULATIVE OPERATION

BACKGROUND OF THE INVENTION

1. Field of the Invention

The present invention is related to an improved arithmetic circuit for accumulative operation for use in digital signal processors, microprocessors and so forth, in which the pipelined control becomes effective during accumulative operation by eliminating idling stage in the pipeline.

2. Prior Art

In the accumulative operation for repeatedly performing a series of processing steps in a microprocessor with one cycle of operation being conducted by making use of the result of the previous cycle of operation, the overall processing speed is largely affected by the processing time required for the propagation of carries. For this reason, in the prior art technique, the processing speed for handling carries is conducted by making use of a CSA (Carry Save Adder) in advance of a CPA (Carry Propagation Adder), e.g., in the case that the operands are input with carries. The CSA is composed of a series of FAs (full adders) for high speed addition operation of three operands. One of the three operands is input to the carry-input terminals as carry-in signals while the resultant carry-out signals is output to the next stage rather than input to the adjacent FAs respectively. The final result can be obtained by 2-input adder, i.e., the CSA, provided for adding the outputs of the CSA.

On the other hand, the timing alignment between the two adders, i.e., the CPA and the CSA is established by making use of appropriate data latching circuits therebetween. The data latching circuits are required, for example, in the case that the operation time required in the CPA is relatively long as compared with the machine cycle time or in the case that the CPA is a circuit which operates under a certain timing restriction such as a precharge-type circuit.

In the following explanation, the operation of prior art arithmetic circuits provided with such data latching circuits will be explained with reference to the accumulative addition and the accumulative subtraction.

First of all, the prior art accumulative addition will be explained with reference to FIG. 1. As illustrated in FIG. 1, two input data operands Ai and Bi and the data latched on to an output register 32 are added, and the result is written to the output register 22. The result of the addition Ai+Bi is accumulated by repeating this process. Namely, the operation is performed as in the following equation.

(Initial Data)+$(A_0+B_0)$+$(A_1+B_1)$+ . . .

The two input data operands are given with a variety of applications. In one typical case, one input data A is comprised of carries while the other input data B is comprised of sums in a carry saved fashion for accumulative addition.

The accumulative adder comprises a selector circuit (multiplexer) 31 for selecting data to be loaded from arbitrary data and the outputs of the adder, an output register 32 for storing the outputs of the selector circuit 31, a CSA 33 for receiving the outputs of the output register 32 and input data operands Ai and Bi, intermediate result latching registers 34 and 35 for latching the outputs of the CSA 33 and a CPA 36 for receiving the outputs of the registers 34 and 35 as illustrated in FIG. 1.

Next, the arithmetic operation of the accumulative adder will be explained in the followings.

(Machine Cycle 1)

First of all, initial data is selected by the selector circuit 31 and written to the register 32 in order to load the initial data for addition.

(Machine Cycle 2)

In the next cycle, the CSA 33 performs the addition of the input data operands Ai and Bi and the outputs of the register 32 as input signals. The result of the addition is output as carries S1 and the sums S2 and latched on to the intermediate result latching register 34 respectively.

(Machine Cycle 3)

Next, the CPA 36 performs the addition of data as latched on to the register 34 and the register 35. The result of the addition as calculated by the CPA 36 is selected and written to the output register 32.

The addition operation is repeated by repeating the machine cycles 2 and 3.

Next, the prior art arithmetic circuit for accumulative subtraction will be explained with reference to FIG. 2.

The accumulative subtraction is performed by the subtraction formula.

(Initial Data)−(Input $A_0$+Input $B_0$)−(Input $A_1$+Input $B_1$) . . .

Also in this case, the operands are input in the form of carries and sums in which, for example, one input data operand Ai stands for carries while the other data operand Bi stands for sums in a carry saved fashion for accumulative subtraction, in the same manner as the addition circuit as described above. From the subtraction formula, the accumulative subtraction is represented by the following equation with input data Ai and Bi as a subtrahend and the initial data or the result of the previous accumulative subtraction as a minuend.

$$P1 - (A_0 + B_0) = \overline{\overline{P1} + A_0 + B_0}$$

Accordingly, the accumulative subtraction is realized by combination of an inverter and an adder.

The accumulative subtraction circuit is composed of a selector circuit 31 for selecting and outputting either of data to be loaded to the register 32 (the initial data) or the outputs of the adder, a register 32 for latching the outputs of the selector circuit 31, an inverter 37 for inverting the outputs of the register 32, a CSA 33 for receiving the outputs of the output register 32 and input data operands Ai and Bi, intermediate result latching register 34 and 35 for latching the carry and sums of the CSA 33, a CPA 36 for receiving the outputs of the registers 34 and 35 and an inverter 38 for inverting the outputs of the CPA as illustrated in FIG. 2.

Next, the arithmetic operation of the accumulative subtracter will be explained in the followings.

(Machine Cycle 1)

First of all, initial data is selected by the selector circuit 31 and written to the register 32 in order to load the initial data for addition.

(Machine Cycle 2)

In the next cycle, the CSA 33 performs the addition of the input data A and B and the inversion of the outputs of the register 32 as input signals in accordance with the following equation.

($\overline{P1}$+$A_0$+$B_0$)

The result of the addition is output as carries S1 and the sums S2 and latched on to the intermediate result latching register 34 and 35.

(Machine Cycle 3)

Next, the CPA 36 performs the addition of data as latched on to the register 34 and the register 35. The result of the addition as performed by the CPA 36 is inverted and outputted through the inverter 38. In this cycle, the selector circuit 31 selects the inversion of the output result of the CPA 36, followed by writing the operation result in accordance with the following equation to the register 32.

$$\overline{(P1 + A_0 + B_0)}$$

The subtraction operation is repeated by repeating the machine cycles 2 and 3, and after completing predetermined times of the repetition, the final result of the accumulative subtraction is obtained in the output register 32.

However, there are following shortcomings in the prior art accumulative arithmetic circuits as described above. These shortcomings will be explained with reference to FIG. 3. Namely, in the field to which the present invention pertains, pipelined control is usually implemented for the purpose of improving the processing speed of the operation. In the pipelined control, each instruction is divided into a plurality of the processing stages so that a plurality of instructions can be executed in parallel in different stages.

Namely, execution of one instruction can be initiated while the previous instruction is being executed.

However, the repetition of the prior art accumulative operation is possible only by reading and referring to the previous operation result. Namely, as illustrated in FIG. 3 which shows a series of the accumulative addition operation (instruction 1, instruction 2, instruction 3 and so forth), each operation of the accumulative addition consists of the addition by the CSA (the first step) and the addition by the CPA (the second step), and therefore completed in two machine cycles. In accordance with the pipelined control, execution of an instruction 1 would be possible in advance of completing execution of an instruction 2. However, the contents of the output register have to be accessed to in he n-th cycle (n>2) at time T22 or T32, only after completion of writing the result of the previous addition performed by the CPA to the output register in the second step, because the n-th cycle (n>2) requires the result in the n-th cycle (n>2). For this reason, the execution of the respective instructions are serialized so that there occur idling stages as depicted with arrows T21 and T31. As a result, much time is required to complete the accumulative operation.

As detailedly explained in the above, in accordance with the prior art technique, idling stages tend to occur in the pipelined structure so that the operation time as required increases resulting in deteriorating the performance of the processor.

SUMMARY OF THE INVENTION

The present invention has been made in order to solve the shortcomings as described above. It is an important object of the present invention to provide an improved arithmetic circuit for accumulative operation for use in digital signal processors, microprocessors and so forth, in which the next operation is initiated with intermediate results while the previous operation is being executed and not yet completed so that it is possible to reduce the scale of integration.

It is another associated object of the present invention to provide an improved arithmetic circuit for accumulative operation for use in digital signal processors, microprocessors and so forth, in which multiplication operation can be executed in parallel to accumulative operation having operand dependency upon the multiplication operation.

It is further associated object of the present invention to provide an improved arithmetic circuit for accumulative operation for use in digital signal processors, microprocessors and so forth, in which multiplication and accumulative subtraction can be effectively executed by dispensing with taking complement for intermediate results.

In brief, the above and other objects and advantages of the present invention are provided by a new and improved arithmetic circuit for accumulative operation comprises:

a first addition circuit for receiving and adding a plurality of input data operands and outputting two outputs of intermediate data of the addition; and intermediate result latching means for receiving and latching said two outputs of intermediate data as first and second intermediate results, wherein in the case that addition is performed by the use of the previous result of the accumulative operation, the two outputs of intermediate data of the addition calculated by said first addition circuit and latched on to said intermediate result latching means are supplied to said first addition circuit as two of said input data operands for next operation of accumulative addition to be conducted by said first addition circuit.

Also, in accordance with a preferred embodiment of the present invention, the accumulative operation is initiated by supplying two arbitrary data operands of initial data to said first addition circuit in place of the two outputs of intermediate data of the addition.

Furthermore, in accordance with a preferred embodiment of the present invention, said first addition circuit receives said input data operands through a first selector for selectively supplying either of said first intermediate result as latched on to said intermediate result latching means or one of said arbitrary data operands of said initial data, and a second selector for selectively supplying either of said second intermediate result as latched on to one of said intermediate result latching means or an all zero data operand.

Furthermore, in accordance with a preferred embodiment of the present invention, said first addition circuit is an addition circuit comprising a 4-2 compactor.

In accordance with a further aspect of the present invention, a new and improved arithmetic circuit for accumulative operation comprises:

a first addition circuit for receiving and adding a plurality of input data operands and outputting two outputs of intermediate data of the addition; and intermediate result latching means for receiving and latching said two outputs of intermediate data as first and second intermediate results, wherein in the case that the plurality of input data operands are added up together and subtracted from initial data given as a minuend, the inversion of said initial data is given to said first addition circuit and added up together with the input data operands as externally supplied, and the two outputs of intermediate data are latched on to said intermediate result latching means, and wherein in the case that the plurality of input data operands are added up together and subtracted from the results of the previous operation as a minuend, the two outputs of intermediate data of the addition calculated by said first addition circuit and latched on to said intermediate result latching means are supplied to said first addition as two of said input data operands for next accumulative operation to be conducted by said first addition circuit, and the accumulative operation is repeated for predetermined times while the result of accumulative subtraction is obtained by adding up together the two outputs of intermediate data and inverting the result of the addition.

Furthermore, in accordance with a preferred embodiment of the present invention, the arithmetic circuit for accumulative operation further comprises:

a second addition circuit connected to said intermediate result latching means for adding up said first and second intermediate results as latched on to said intermediate result latching means and outputting a result of addition;

a first inverter connected to said second addition circuit for inverting output data of said second addition circuit;

a second inverter for outputting the inversion of arbitrary initial data;

a second selector for selectively outputting to said first addition circuit either of said first intermediate result and the inversion of the inversion of arbitrary initial data;

wherein the two outputs of intermediate data of the addition calculated by said first addition circuit and latched on to said intermediate result latching means are supplied to said first addition as two of said input data operands for next accumulative operation to be conducted by said first addition circuit.

Furthermore, in accordance with a preferred embodiment of the present invention, the arithmetic circuit for accumulative operation further comprises:

a third selector connected to said first addition circuit and another of said intermediate result latching means for selectively outputting to said first addition circuit either of said first intermediate result and all zero data.

In accordance with a further aspect of the present invention, a new and improved arithmetic circuit for accumulative operation comprises:

an addition circuit for receiving and adding a plurality of input data operands and outputting two outputs of intermediate data of the addition; and intermediate result latching means for receiving and latching said two outputs of intermediate data as first and second intermediate results, wherein the plurality of input data operands are supplied to added up together by said addition circuit and the two outputs of intermediate data are latched on to said intermediate result latching means, wherein the inversion of the two outputs of intermediate data of the addition calculated by said first addition circuit and latched on to said intermediate result latching means are supplied to said addition circuit and added up together with the plurality of input data operands supplied as a minuend, and the result of the addition is latched on to said intermediate result latching means, and wherein the two outputs of intermediate data of the addition latched on to said intermediate result latching means are added up, and the result is incremented by 1 and inverted to obtain the final result of the operation.

Also, in accordance with a preferred embodiment of the present invention, in the case that the plurality of input data operands are added up together and subtracted from the results of the previous operation as a minuend, the two outputs of intermediate data latched on to said intermediate result latching means are supplied to said addition circuit and added up together with the plurality of input data operands as a minuend, and the accumulative operation is repeated for predetermined times while the result of accumulative subtraction is obtained by adding up together the two outputs of intermediate data and incrementing the result by 1.

In accordance with a further aspect of the present invention, a new and improved arithmetic circuit for accumulative operation comprises:

a multiplication circuit for generating a multiplication result of a multiplier and a multiplicand in the form of sums and carries;

a first addition circuit for receiving and adding a plurality of input data operands including said sums and said carries and outputting two outputs of intermediate data of the addition; and intermediate result latching means for receiving and latching said two outputs of intermediate data as first and second intermediate results, wherein in the case that multiplication and accumulative addition is repeated by the use of the previous result of the accumulative operation, the two outputs of intermediate data of the addition calculated by said first addition circuit and latched on to said intermediate result latching means are supplied to said first addition as two of said input data operands for next multiplication and accumulative addition to be conducted by said first addition circuit.

In accordance with a further aspect of the present invention, a new and improved arithmetic circuit for accumulative operation comprises:

a multiplication circuit for generating a multiplication result of a multiplier and a multiplicand in the form of sums and carries;

a first addition circuit for receiving and adding a plurality of input data operands including said sums and said carries and outputting two outputs of intermediate data of the addition: and intermediate result latching means for receiving and latching said two outputs of intermediate data as first and second intermediate results, wherein the first and second intermediate results are added up together and subtracted from the results of the previous operation as a minuend, wherein, in the case that initial data is given as minuend, the inversion of arbitrary initial data is supplied to said first addition circuit and added up together with sums and carries as supplied from said multiplication circuit, and the two outputs of said first addition circuit are latched on to said intermediate result latching means as first and second intermediate results, wherein, in the case that subtraction is repeated, said first and second intermediate results as latched on to said intermediate result latching means are supplied to said first addition circuit as two of said input data operands for next operation and repeating the supply to said first addition circuit, and wherein the result of accumulative subtraction is obtained by adding up together the two outputs of intermediate data and incrementing the result by 1.

Furthermore, in accordance with a preferred embodiment of the present invention, the arithmetic circuit for accumulative operation further comprises:

a first inverter connected to said second addition circuit for inverting output data of said second addition circuit;

a first selector receiving an initial data and connected to said first inverter for selectively outputting either of said initial data and the inversion of the output data of said second addition circuit as inverted by said first inverter;

resultant data latching means connected to said first selector for latching either of said initial data and the inversion of the output data of said second addition circuit as inverted by said first inverter;

a second inverter connected to said resultant data latching means for outputting the inversion of the output data of resultant data latching means;

a third inverter connected to one of said intermediate result latching means for outputting the inversion of said first intermediate result;

a second selector connected to said first addition circuit, said second inverter, said third inverter and one of said intermediate result latching means for selectively outputting to said first addition circuit either of said first intermediate result, the inversion of said first intermediate result as inverted by said third inverter and the inversion of the output data of said second addition circuit as inverted by said first inverter.

Furthermore, in accordance with a preferred embodiment of the present invention, the arithmetic circuit for accumulative operation further comprises:

a fourth inverter connected to another of said intermediate result latching means for outputting the inversion of said second intermediate result;

a third selector connected to said first addition circuit and another of said intermediate result latching means for selectively outputting to said first addition circuit either of said second intermediate result, the inversion of said second intermediate result as inverted by said third inverter and all zero data.

Furthermore, in accordance with a preferred embodiment of the present invention, the arithmetic circuit for accumulative operation further comprises:

a first inverter for inverting output data of a second addition circuit connected to said intermediate result latching means for adding up said first and second intermediate results as latched on to said intermediate result latching means and outputting a result of addition;

a second inverter for outputting the inversion of arbitrary initial data; and a second selector for selectively supplying to said first addition circuit either of the output data of one of said intermediate result latching means and the output data of said second inverter.

Furthermore, in accordance with a preferred embodiment of the present invention, the arithmetic circuit for accumulative operation further comprises:

a second addition circuit for adding up said first and second intermediate results as latched on to said intermediate result latching means and outputting a result of addition; and a first inverter connected to said second addition circuit for inverting output data of said second addition circuit;

a second inverter for outputting the inversion of arbitrary initial data;

a third inverter for outputting the inversion of said first intermediate result;

a second selector for selectively outputting to said first addition circuit either of the inversion of arbitrary initial data, the output data of one of said intermediate result latching means and said first intermediate result.

In accordance with a further aspect of the present invention, a new and improved arithmetic circuit for accumulative operation comprises:

a multiplication circuit for generating a multiplication result of a multiplier and a multiplicand in the form of sums and carries;

a first addition circuit for receiving and adding a plurality of input data operands including said sums and said carries and outputting two outputs of intermediate data of the addition; and intermediate result latching means for receiving and latching said two outputs of intermediate data as first and second intermediate results, wherein the sums and carries obtained as the results of the multiplication are supplied to said first addition circuit and the two outputs of intermediate data of the addition calculated by said first addition circuit are latched on to said intermediate result latching means, and wherein the two outputs of the intermediate result latching means are inverted and supplied to supplied to said first addition circuit as two of said input data operands for next operation, the addition of the sums and carries obtained as supplied from said multiplication circuit is performed, the two intermediate results thereof are latched on to said intermediate result latching means and added up together with the two outputs of intermediate data of the addition calculated by said first addition circuit, incremented by 1 and inverted to obtain the result of the multiplication and accumulative subtraction.

Also, in the case that the accumulative subtraction is performed with the result of the previous multiplication operation as a subtrahend and the result of the previous subtraction operation as a minuend, the two outputs as latched on to said intermediate result latching means are supplied to said first addition circuit as two of said input data operands for next accumulative operation to be conducted by said first addition circuit in place of said two inversion results and added up together with sums and carries as supplied from said multiplication circuit, and the two outputs of said first addition circuit are latched on to said intermediate result latching means followed by repetition of these procedures for predetermined times, and wherein the two outputs of intermediate data of the addition circuit latched on to said intermediate result latching means are added up, and the result is incremented by 1 and inverted to obtain the final result of the operation.

Also, in accordance with a preferred embodiment of the present invention, the two outputs of intermediate data of the addition circuit latched on to said intermediate result latching means are added up by means of a carry propagation adder, as a second addition circuit, while the increment of 1 is performed as a carry-in signal.

Furthermore, in accordance with a preferred embodiment of the present invention, the arithmetic circuit for accumulative operation further comprises:

a first inverter connected to said second addition circuit for inverting output data of said second addition circuit;

a first selector receiving an initial data and connected to said first inverter for selectively outputting either of said initial data and the inversion of the output data of said second addition circuit as inverted by said first inverter;

resultant data latching means connected to said first selector for latching either of said initial data and the inversion of the output data of said second addition circuit as inverted by said first inverter;

a second inverter connected to said resultant data latching means for outputting the inversion of the output data of resultant data latching means;

a third inverter connected to one of said intermediate result latching means for outputting the inversion of said first intermediate result;

a second selector connected to said first addition circuit, said second inverter, said third inverter and one of said intermediate result latching means for selectively outputting to said first addition circuit either of said first intermediate result, the inversion of said first intermediate result as inverted by said third inverter and the inversion of the output data of said second addition circuit as inverted by said first inverter.

Also, in accordance with a preferred embodiment of the present invention, the arithmetic circuit for accumulative operation further comprises:

a fourth inverter connected to another of said intermediate result latching means for outputting the inversion of said second intermediate result;

a third selector connected to said first addition circuit and another of said intermediate result latching means for selectively outputting to said first addition circuit either of said second intermediate result, the inversion of said second intermediate result as inverted by said third inverter and all zero data.

In accordance with a further aspect of the present invention, a new and improved arithmetic circuit for accumulative operation comprises:

a multiplication circuit for generating a multiplication result of a multiplier and a multiplicand in the form of sums and carries;

a first addition circuit for receiving and adding a plurality of input data operands including said sums and said carries as outputs from said multiplication circuit and the inversion of said sums and said carries as a result of the previous multiplication conducted by said multiplication circuit and outputting two outputs of intermediate data of the addition circuit; and intermediate result latching means for receiving and latching said two outputs of intermediate data as first and second intermediate results, wherein the first and second intermediate results are added up together and incremented by 1 and inverted to obtain the final result of the operation.

In brief, the above and other objects and advantages of the present invention are provided by a new and improved arithmetic circuit for accumulative operation capable of multiplication and accumulative addition and multiplication and accumulative subtraction comprises:

a multiplication circuit for generating a multiplication result of a multiplier and a multiplicand in the form of sums and carries;

a first addition circuit for receiving and adding a plurality of input data operands including said sums and said carries and outputting two outputs of intermediate data of the addition circuit; and intermediate result latching means for receiving and latching said two outputs of intermediate data as first and second intermediate results, wherein said sums and said carries as a result of initial multiplication conducted by said multiplication circuit are supplied to said first addition circuit and the two outputs of intermediate data of the addition calculated by said first addition circuit are latched on to said intermediate result latching means, wherein, in the case that the multiplication and accumulative addition is performed, the results latched on to said intermediate result latching means are supplied to said first addition circuit as two of said input data operands for next accumulative operation and added up together with sums and carries as supplied from said multiplication circuit; the two outputs of said first addition circuit are latched on to said intermediate result latching means and added up together with the next data latched on to said intermediate result latching means to obtain the final result of the multiplication and accumulative addition operation, and wherein, in the case that the multiplication and accumulative subtraction is performed, the results latched on to said intermediate result latching means are inverted and supplied to said first addition circuit as two of said input data operands for next accumulative operation and added up together with sums and carries as supplied from said multiplication circuit, and the two outputs of said first addition circuit are latched on to said intermediate result latching means and added up together with the next data latched on to said intermediate result latching means and incremented by 1 and inverted to obtain the final result of the multiplication and accumulative subtraction operation.

Also, in the case that accumulative operation is repeated, the results latched on to said intermediate result latching means are inverted and supplied to said first addition circuit as two of said input data operands for next accumulative operation, and the two outputs of said first addition circuit are added up together and incremented by 1 and inverted to obtain the final result of the accumulative operation In accordance with a further aspect of the present invention, a new and improved arithmetic circuit for accumulative operation comprises:

a first addition circuit for receiving and adding a plurality of input data operands and outputting two outputs of intermediate data of the addition;

intermediate result latching means connected to said first addition circuit for receiving and latching said two outputs of intermediate data as first and second intermediate results; and a second addition circuit for adding up said first and second intermediate results as latched on to said intermediate result latching means and outputting a result of addition;

wherein the two outputs of intermediate data of the addition calculated by said first addition circuit and latched on to said intermediate result latching means are supplied to said first addition as two of said input data operands for next operation of accumulative addition to be conducted by said first addition circuit.

Also, in accordance with a preferred embodiment of the present invention, the accumulative operation is initiated by supplying two arbitrary data operands of initial data to said first addition circuit in place of the two outputs of intermediate data of the addition.

Furthermore, in accordance with a preferred embodiment of the present invention, at least one of said arbitrary data operands of said initial data supplied to said first addition circuit is all zero data.

Furthermore, in accordance with a preferred embodiment of the present invention, one of said arbitrary data operands is latched on to said resultant data latching means in advance.

Furthermore, in accordance with a preferred embodiment of the present invention, said two outputs of intermediate data of the addition are carries and sums.

Furthermore, in accordance with a preferred embodiment of the present invention, said first addition circuit receives said input data operands through a first selector for selectively supplying either of said first intermediate result as latched on to said intermediate result latching means or one of said arbitrary data operands of said initial data, and a second selector for selectively supplying either of said second intermediate result as latched on to one of said intermediate result latching means or an all zero data operand.

Furthermore, in accordance with a preferred embodiment of the present invention, said first addition circuit is an addition circuit comprising a 4-2 compactor.

In accordance with a further aspect of the present invention, a new and improved arithmetic circuit for accumulative operation comprises:

a first addition circuit for receiving and adding a plurality of input data operands and outputting two outputs of intermediate data of the addition;

intermediate result latching means for receiving and latching said two outputs of intermediate data as first and second intermediate results;

a second addition circuit connected to said intermediate result latching means for adding up said first and second intermediate results as latched on to said intermediate result latching means and outputting a result of addition;

a first inverter connected to said second addition circuit for inverting output data of said second addition circuit;

a second inverter for outputting the inversion of arbitrary initial data;

a second selector for selectively outputting to said first addition circuit either of said first intermediate result and the inversion of the inversion of arbitrary initial data;

wherein the two outputs of intermediate data of the addition calculated by said first addition circuit and latched on to said intermediate result latching means are supplied to said first addition as two of said input data operands for next accumulative operation to be conducted by said first addition circuit.

Furthermore, in accordance with a preferred embodiment of the present invention, the arithmetic circuit for accumulative operation further comprises:

a third selector connected to said first addition circuit and another of said intermediate result latching means for selectively outputting to said first addition circuit either of said first intermediate result and all zero data;

In accordance with a further aspect of the present invention, an arithmetic circuit for accumulative operation comprising:

a multiplier for generating a multiplication result of a multiplier and a multiplicand in the form of sums and carries;

a first addition circuit connected to said multiplier for receiving and adding a plurality of input data operands including said sums and said carries and outputting two outputs of intermediate data of the addition;

intermediate result latching means connected to said first addition circuit for receiving and latching said two outputs of intermediate data as first and second intermediate results;

a second addition circuit connected to said intermediate result latching means for adding up said first and second intermediate results as latched on to said intermediate result latching means and outputting a result of addition;

wherein the two outputs of intermediate data of the addition calculated by said first addition circuit and latched on to said intermediate result latching means are supplied to said first addition as two of said input data operands for next accumulative operation to be conducted by said first addition circuit.

Furthermore, in accordance with a preferred embodiment of the present invention, the arithmetic circuit for accumulative operation further comprises:

a first inverter for inverting output data of a second addition circuit connected to said intermediate result latching means for adding up said first and second intermediate results as latched on to said intermediate result latching means and outputting a result of addition;

a second inverter for outputting the inversion of arbitrary initial data; and a second selector for selectively supplying to said first addition circuit either of the output data of one of said intermediate result latching means and the output data of said second inverter.

Furthermore, in accordance with a preferred embodiment of the present invention, the arithmetic circuit for accumulative operation further comprises:

a second addition circuit for adding up said first and second intermediate results as latched on to said intermediate result latching means and outputting a result of addition; and a first inverter connected to said second addition circuit for inverting output data of said second addition circuit;

a second inverter for outputting the inversion of arbitrary initial data;

a third inverter for outputting the inversion of said first intermediate result;

a second selector for selectively outputting to said first addition circuit either of the inversion of arbitrary initial data, the output data of one of said intermediate result latching means and said first intermediate result.

Furthermore, in accordance with a preferred embodiment of the present invention, the arithmetic circuit for accumulative operation further comprises:

a third selector for selectively supplying to said first addition circuit either of the output of another of said intermediate result latching means and all zero data;

Furthermore, in accordance with a preferred embodiment of the present invention, the arithmetic circuit for accumulative operation further comprises:

a fourth inverter for outputting the inversion of said second intermediate result;

a third selector connected to said first addition circuit and another of said intermediate result latching means for selectively outputting to said first addition circuit either of said second intermediate result, the inversion of said second intermediate result as inverted by said third inverter and all zero data.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF EMBODIMENTS

The First Embodiment

In the following explanation, an accumulative adder in accordance with a first embodiment will be explained in details with reference to figures. The intermediate results in the previous cycle are utilized for the current accumulative addition in this embodiment of the present invention.

Figure 1:
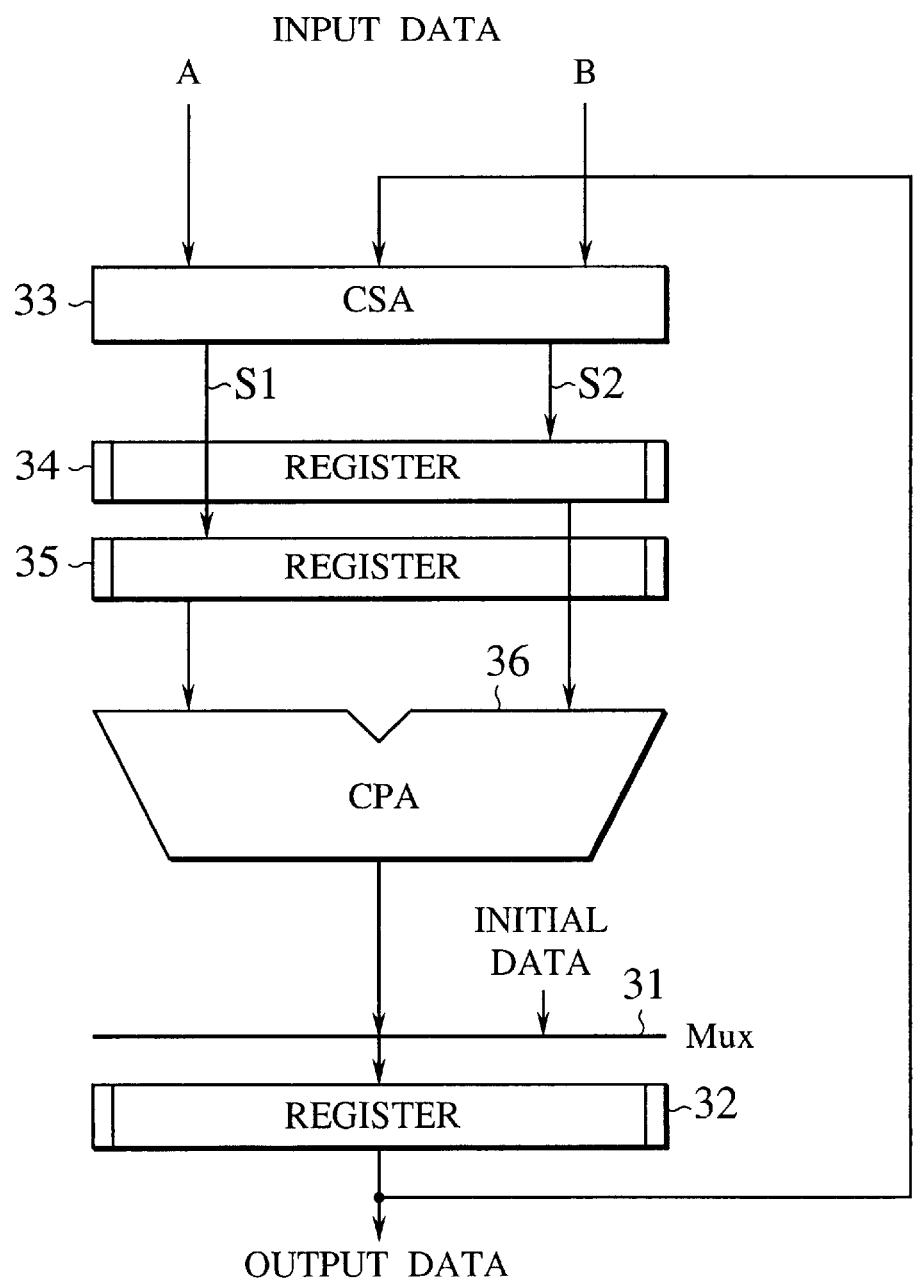
FIG. 1 is a block diagram showing an accumulative adder in accordance with the prior art technique.
Figure 2:
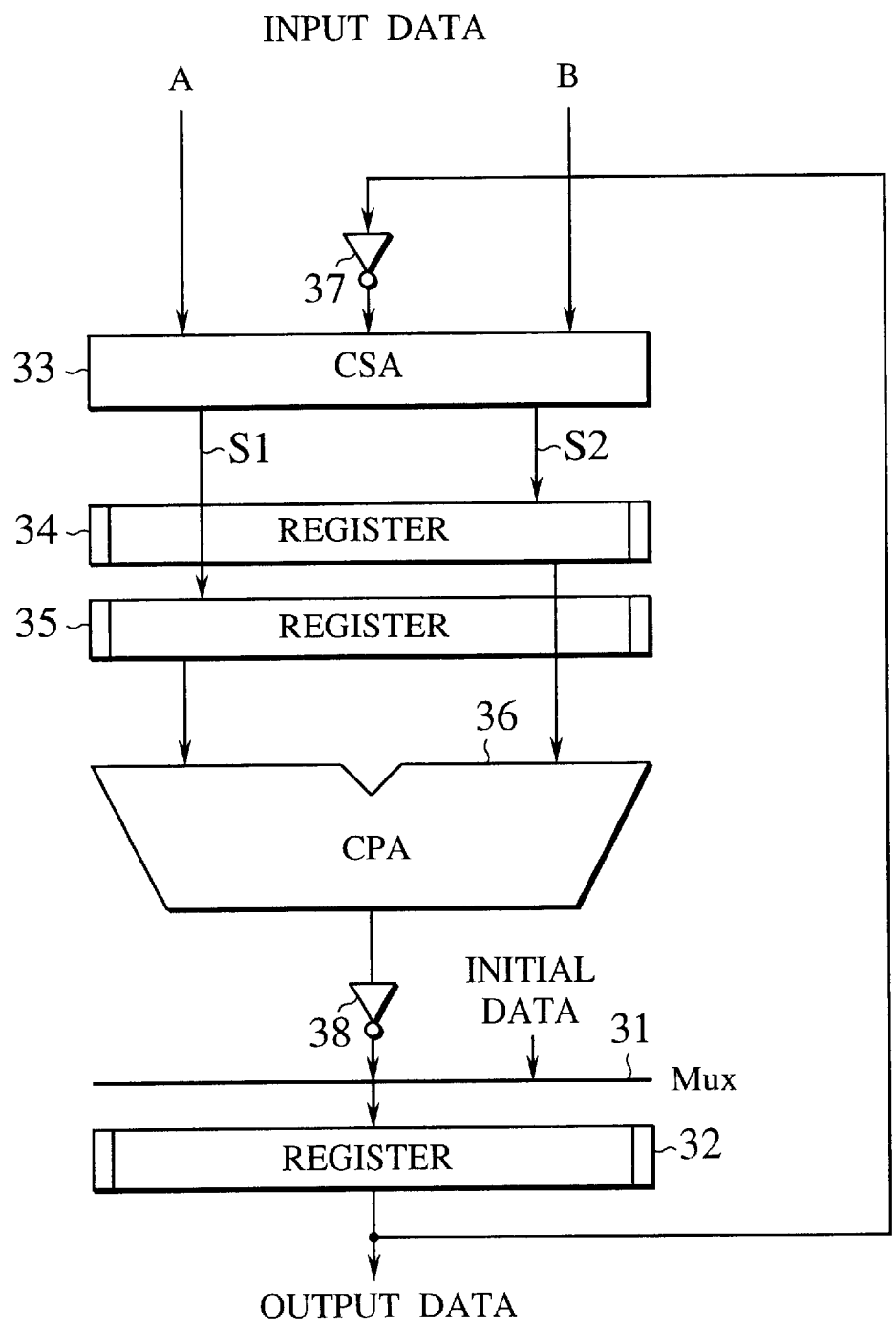
FIG. 2 is a block diagram showing an accumulative subtraction circuit in accordance with the prior art technique.
Figure 3:
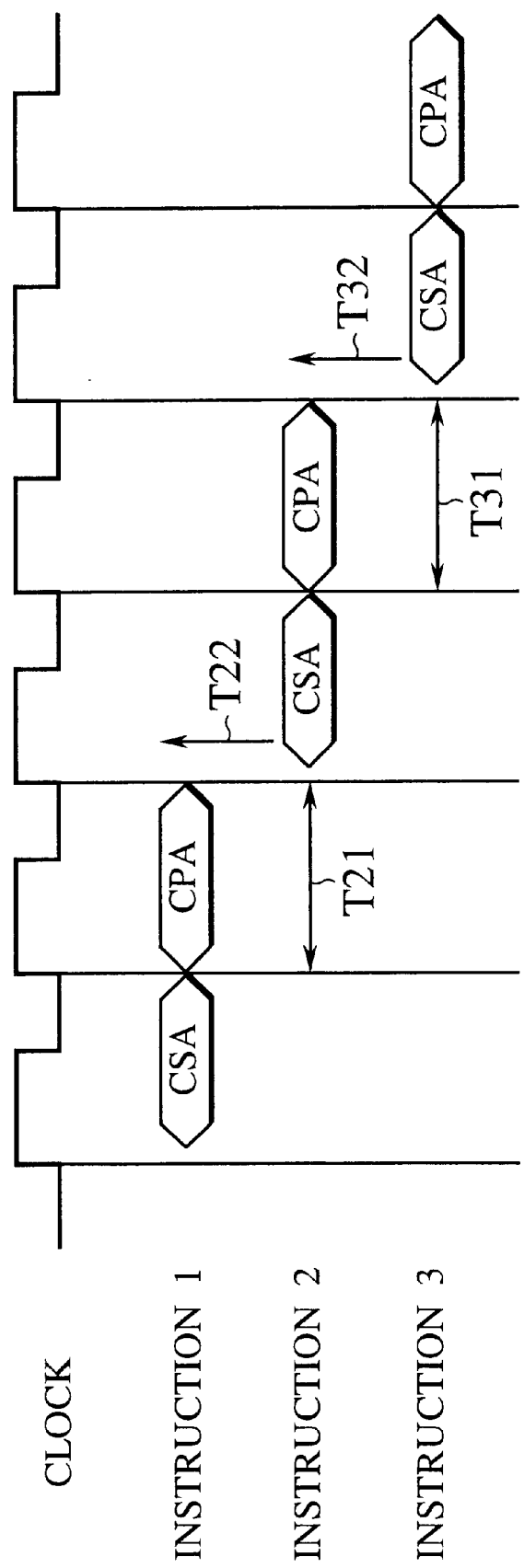
FIG. 3 is a timing chart showing successive execution of arithmetic operation in the pipelined control in accordance with the prior art technique.
Figure 4:
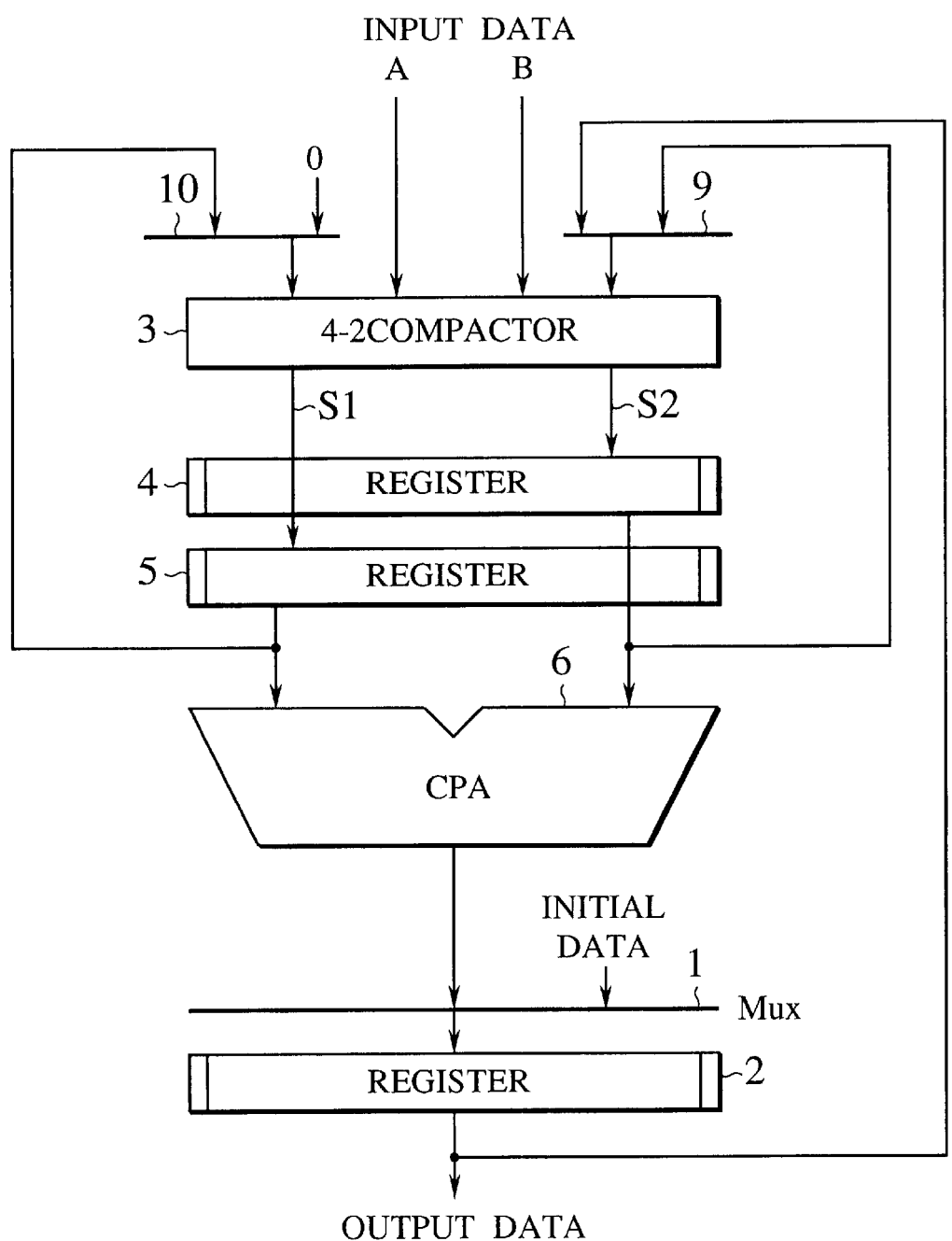
FIG. 4 is a block diagram showing the first embodiment in accordance with the present invention.

FIG. 4 is a block diagram showing the first embodiment in accordance with the present invention. The accumulative adder in accordance with the first embodiment of the present invention comprises selector circuits 9 and 10, a 4-2 compactor 3 for receiving the outputs of the selector circuits 9 and 10 and input data A and B, intermediate result latching registers 4 and 5 for latching signals S1 and S2 as output from the 4-2 compactor 3, a CPA 6 for performing addition of data as output from the register 4 and the register 5, a selector circuit (multiplexer) 1 for selectively outputting either arbitrary data to be loaded as the initial data or the outputs of the CPA 6, an output register 2 for storing the outputs of the selector circuit 1, as illustrated in FIG. 4. The selector circuit 9 receives the data as output from the register 4 and the data as latched on to the register 2 and selectively outputs either one of them. The selector circuit 10 receives the data as output from the register 5 and the data (all zero data) consisting of bits each of which is set "0" and selectively outputs either one of them.

Figure 5:
FIG. 5 is a truth table of each of the elementary circuits of the 4-2 compactor 3.
Figure 6:
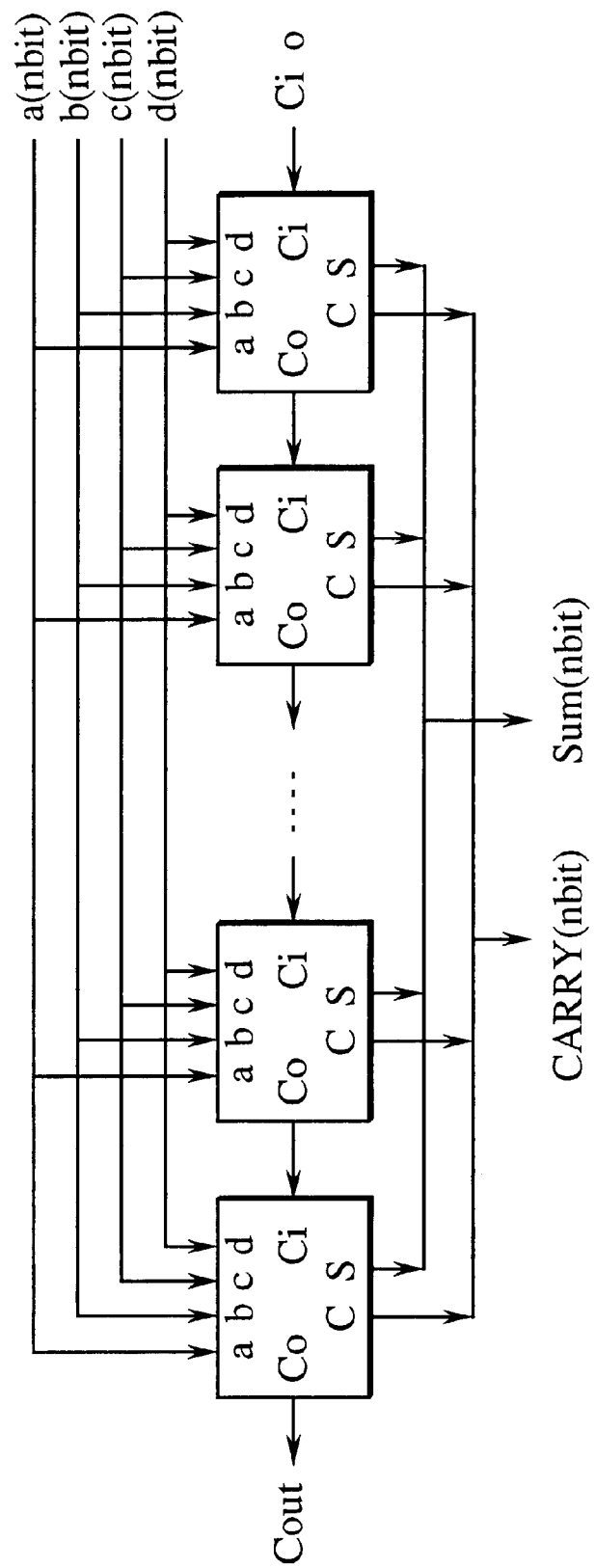
FIG. 6 is a block diagram showing the first embodiment in accordance with the present invention.

In the followings, the 4-2 compactor will be explained in details. The 4-2 compactor receives four input data components, each consisting of n-bit data, e.g. 32-bit data and outputs n-bit Sum and n-bit Carry with 1-bit extra carry Cout. The 4-2 compactor is composed of n equivalent elementary circuits located in the respective bit positions and connected in parallel. FIG. 5 is a truth table of each of the elementary circuits of the 4-2 compactor 3. The signals a, b, c and d are logical values as input to the 4-2 compactor in FIG. 5, i.e., four logic signals of the four input data components at a particularly bit position for which the elementary circuit is responsible. The signal Ci is a carry as input. Also, the signal S, the signal C and the signal Co are a sum, a carry as saved and a carry to be transferred to the adjacent 4-2 compactor. The logical equations of each of the elementary circuits of the 4-2 compactor are as follows in which "∧" denotes XOR and the signal C and the signal Co have an equivalent effect so that they can be exchanged.

$S = a \wedge b \wedge c \wedge d \wedge Ci$ $C = (a \wedge b \& a) | ((a \wedge b) \& c)$ $Co = (a \wedge b \wedge c \wedge d \& d) | (a \wedge b \wedge c \wedge d) \& Ci)$ In this case, the carry signal Co from one elementary circuit is input to the more significant elementary circuit adjacent to that elementary circuit as the carry-in signal Ci. The carry-in signal Ci corresponding to the least significant bit is assumed to be "0" unless otherwise described herein while it is possible to externally supply any arbitrary signal as the carry-in signal Ci.

Meanwhile, the circuit for outputting the two output results is not limited to the 4-2 compactor. The 4-2 compactor can be replaced by any circuit which is capable of performing addition of the input data operand Ai and the input data operand Bi as externally supplied and the carries and the sums as latched the intermediate result latching register 4, and two output results in the form of carries and sums as a result. Accordingly, for example, two carry save adders as combined in two stages can be used to replace the 4-2 compactor. Also, in the case that a logic circuit is located in advance of the 4-2 compactor, appropriate modification may be possible for the logic circuit in order to perform the required operation for outputting two output results in the form of carries and sums.

The configuration of the first embodiment of the present invention will be understood from the above description. The operation of the arithmetic circuit will be explained in the following explanation.

(Machine Cycle 1)

First of all, initial data is selected by the selector circuit 1 and written to the register 2 in order to load the initial data for addition. Hereinbelow, the initial data is referred to as P.

(Machine Cycle 2)

In the next cycle, the selector circuit 9 selects the initial data as latched on to the register 2. Also, the selector circuit 10 selects all zero data. The input data operand Ai, the input data operand Bi, the output of the selector circuit 9 and the output of the selector circuit 10 are added up together in order to generate two output results, which are then latched on to the intermediate result latching registers 4 and 5 respectively.

(Machine Cycle 3)

Next, the CPA 6 performs the addition of data as latched on to the register 4 and the register 5. The result of the addition as calculated by the CPA 6 is selected by the selector circuit 1 and written to the output register 2. In this case, the result of the addition is obtained in accordance with the following equation.

$(P + A_0 + B_0)$

On the other hand, the selector circuit 9 selects the output of the intermediate result latching register 4 and outputs it to the 4-2 compactor. At the same time, the selector circuit 10 selects the output of the intermediate result latching register 5 and outputs it to the 4-2 compactor.

Also, the next input data operands $A_1$ and $B_1$ are input to the 4-2 compactor in the same cycle. The two results of the addition in this cycle are latched on to the registers 4 and 5 respectively. In this case, the two results of the addition are sums and carries. Namely, the result of the addition is represented by the following equation.

$$(P+(A_0+B_0)+(A_1+B_1))$$

The accumulative addition operation is then repeated by repeating the machine cycle 3 for predetermined times.

Figure 7:
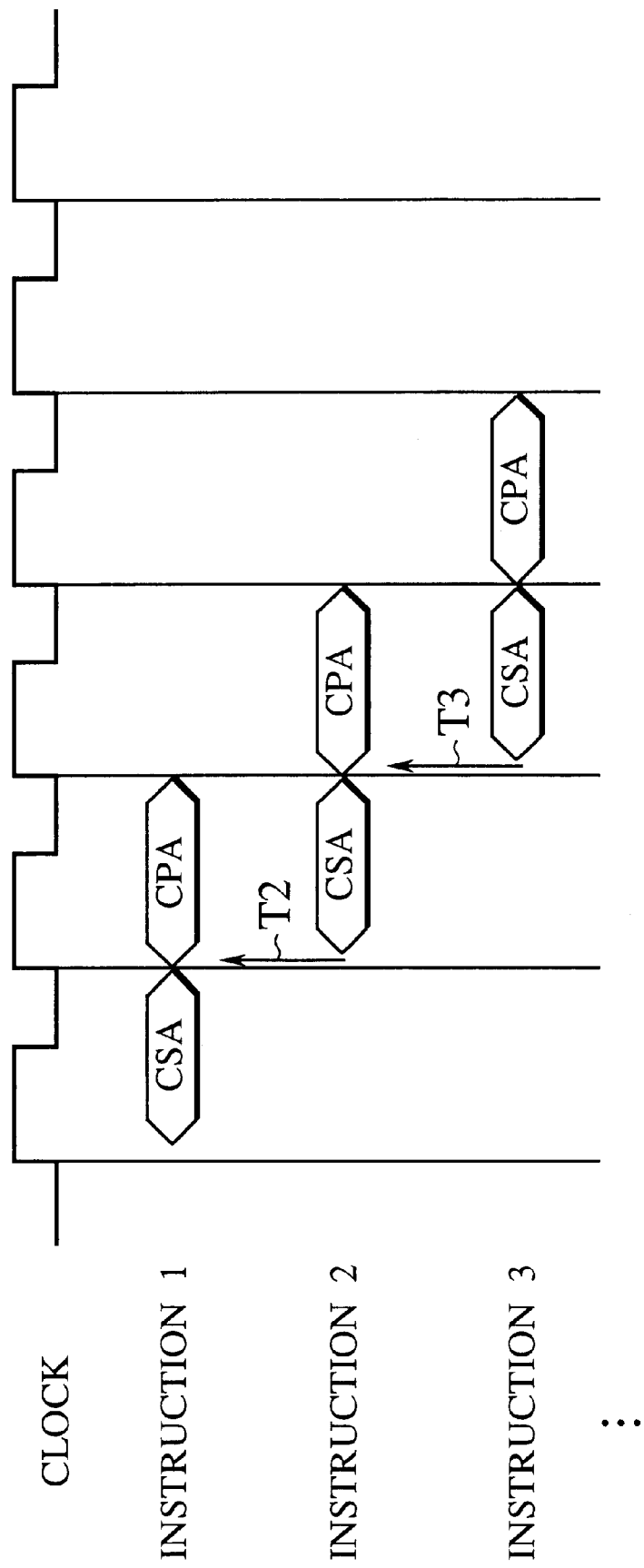
FIG. 7 is a timing chart showing successive execution of arithmetic operation in the pipelined control in accordance with the present invention.

Next, the advantages of this embodiment of the present invention will be explained with reference to FIG. 7. The operations as described above are carried out as illustrated in FIG. 7. In accordance with the first embodiment of the present invention, without need for awaiting the completion of the operation in the CPA 6, the next instruction 2 is immediately executed by the 4-2 compactor (which is corresponding to the CSA in the above described prior art) in the next cycle by the use of the intermediate data as obtained from the intermediate result latching registers 4 and 5. For this reason, the machine cycle 2 of the current instruction is performed in parallel with the machine cycle 3 of the previous instruction. Accordingly, idling stages occurring in the pipelined control in accordance with the prior art technique is eliminated in the case of the present invention so that it becomes possible to obtain improvement of the operation performance and to reduce the processing time as required.

The Second Embodiment

In the following explanation, an accumulative subtractor in accordance with a second embodiment will be explained in details with reference to figures. In this case, redundant description which is common to that of the first embodiment will be dispensed with. In this embodiment of the present invention, the intermediate results in the previous cycle are utilized for the accumulative subtraction.

First of all, the equation corresponding to the operation to be performed in the second embodiment of the present invention will be explained. In this embodiment of the present invention, the operations corresponding the following equation is performed.

$$(\text{Initial Data}) - (\text{Input Data}\, A_0 + \text{Input Data}\, B_0) - (\text{Input Data}\, A_1 + \text{Input Data}\, B_1) - \ldots (\text{Input Data}\, A_n + \text{Input Data}\, B_n)$$

When the initial data P and input data of $(A_0, B_0)$, $(A_1, B_1)$, ... $(A_n, B_n)$ are sequentially input to the 4-2 compactor, the following equation is established.

$$P - (A_0 + B_0) - (A_1 + B_1) - (A_2 + B_2) \ldots - (A_n + B_n) = \overline{\overline{P} + A_0 + B_0 + A_1 + B_1 + A_2 + B_2 + \ldots A_n + B_n} \quad (1)$$

Accordingly, the input data $A_0$ and the input data $B_0$ are added to the inversion of the initial data, then the input data $A_1$ and the input data $B_1$ are added to the previous result of the addition, and then repeating the similar operation with the input data Ai(i=2 to n) and the input data Bi(i=2 to n). The final result of the accumulative subtraction can be obtained from the $CPA_2$ through an inverter by adding sums to carries and inverting the result.

Figure 8:
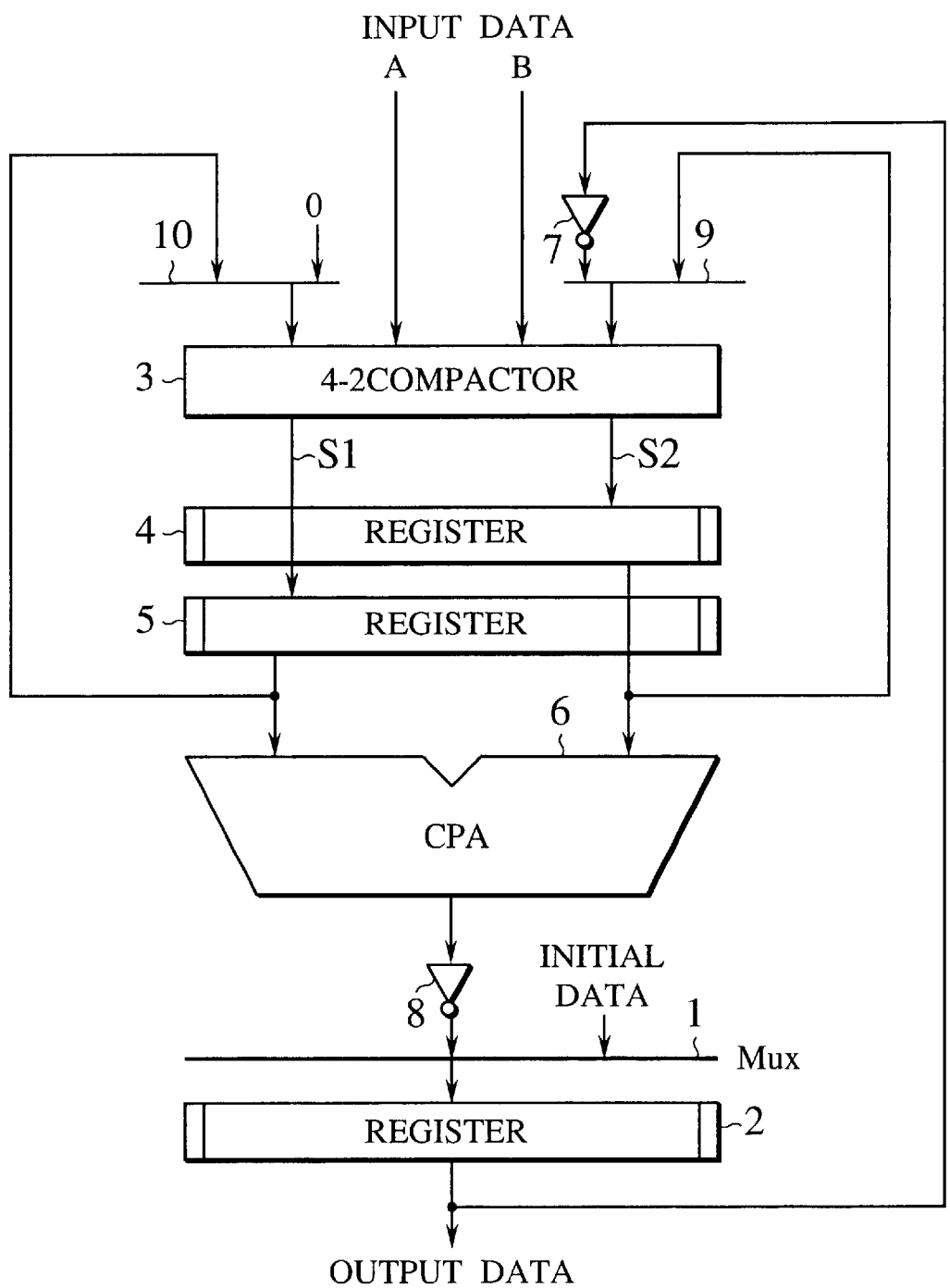
FIG. 8 is a circuit block diagram showing the accumulative subtractor in accordance with the second embodiment of the present invention.

FIG. 8 is a circuit block diagram showing the accumulative subtractor in accordance with the second embodiment of the present invention. As illustrated in FIG. 8, there are provided an inverter 7 for inverting the initial data and an inverter 8 for inverting the result of the addition by the CPA in accordance with the second embodiment of the present invention as compared with the first embodiment of the present invention. The accumulative subtractor comprises a selector circuit (multiplexer) 1, an output register 2, inverters 7 and 8, selectors 9 and 10, a 4-2 compactor, intermediate result latching registers 4 and 5, and the CPA 6. The 4-2 compactor serves to add up the input data operands Ai and Bi, the output of the selector 9 and the output of the selector 10 together in order to generate two output results, i.e., the sums and the carries. The intermediate result latching register 4 serves to latch the carries as output from the 4-2 compactor while the intermediate result latching register 5 serves to latch the sums as output from the 4-2 compactor. The CPA 6 receives the sums and the carries as output from the 4-2 compactor through the intermediate result latching registers 4 and 5, adds up them together and outputs the result of the addition. The inverter 8 is connected to the CPA 6 and serves to invert the result of the addition. The selector circuit 1 serves to select data to be loaded on to the output register 2 from arbitrary data externally supplied and the outputs of the inverter 8. The selector 9 receives the data as latched on to the register 2 and inverted by the inverter 7 and the data as latched on to the intermediate result latching register 4 and selectively outputs either of them. The selector 10 receives all zero data and the data as latched on to the intermediate result latching register 5 and selectively outputs either of them.

Meanwhile, the circuit for outputting the two output results is also not limited to the 4-2 compactor in the same manner as the first embodiment of the present invention.

The operation of the arithmetic circuit as illustrated above will be explained in the following.

(Machine Cycle 1)

First of all, initial data is selected by the selector circuit 1 and written to the register 2 in order to load the initial data for addition.

(Machine Cycle 2)

In the next cycle, the selector circuit 9 selects the inversion of the initial data as latched on to the register 2 and inverted by the inverter 7. Also, the selector circuit 10 selects all zero data. The input data operand Ai, the input data operand Bi, the output of the selector circuit 9 and the output of the selector circuit 10 are added up together in order to generate two output results, which are then latched on to the intermediate result latching registers 4 and 5 respectively.

$$(\overline{P} + A_0 + B_0)$$

(Machine Cycle 3)

Next, the CPA 6 performs the addition of data as latched on to the register 4 and the register 5. The result of the addition as calculated by the CPA 6 is inverted by the inverter 8, selected by the selector circuit 1 and written to the output register 2. The result of the operation is obtained at the time in accordance with the following equation.

$$\overline{(\overline{P} + A_0 + B_0)}$$

At the same time, the selector 9 selects the output of the register 4 and output it to the 4-2 compactor. On the other hand, the selector 10 selects the output of the register 5 and output it to the 4-2 compactor in the same manner.

Also, in the same cycle, the next input data operands $A_1$ and $B_1$ are input to the 4-2 compactor 3 and added up together with the outputs $A_0$ and $B_0$ of the selector 9 and the selector 10 as in the following equation.

$$(\overline{P} + A_0 + B_0 + A_1 + B_1)$$

The two results of the addition in this cycle are latched on to the registers 4 and 5 respectively.

The accumulative subtraction operation is then repeated by repeating the machine cycle 3 for predetermined times in which the result of the addition of each pair of input data operands is successively subtracted from the initial data in sequence. The final result of the subtraction can be extracted from the output register 2.

Next, the advantages of this embodiment of the present invention will be explained. Namely, also in accordance with the second embodiment of the present invention, without need for awaiting the completion of the operation in the CPA 6, the subsequent instruction is immediately executed by the 4-2 compactor in the next cycle of the subtraction by the use of the intermediate data as obtained from the intermediate result latching registers 4 and 5. For this reason, in the same manner as the first embodiment of the present invention, the idling stages occurring in the pipelined control in accordance with the prior art technique is eliminated in the case of the present invention so that it becomes possible to obtain improvement of the operation performance and to reduce the processing time as required.

The Third Embodiment

In the following explanation, a multiplication and accumulative addition circuit in accordance with a third embodiment will be explained in details with reference to figures. In this case, redundant description which is common to those of the first and second embodiments will be dispensed with.

In this embodiment of the present invention, the intermediate results in the previous cycle are utilized for the multiplication and accumulative addition. Namely, the equation corresponding to the operation to be performed in the third embodiment of the present invention is as follows.

(Initial Data/Result of Multiplication)+(Multiplicand $A_0 \times$Multiplier $B_0$)+(Multiplicand $A_1 \times$Multiplier $B_0$)+ . . . (Multiplicand $A_1 \times$Multiplier $B_0$)

The first term may be either a predetermined initial data or the output result of multiplication as obtained by the multiplication circuit.

Figure 9:
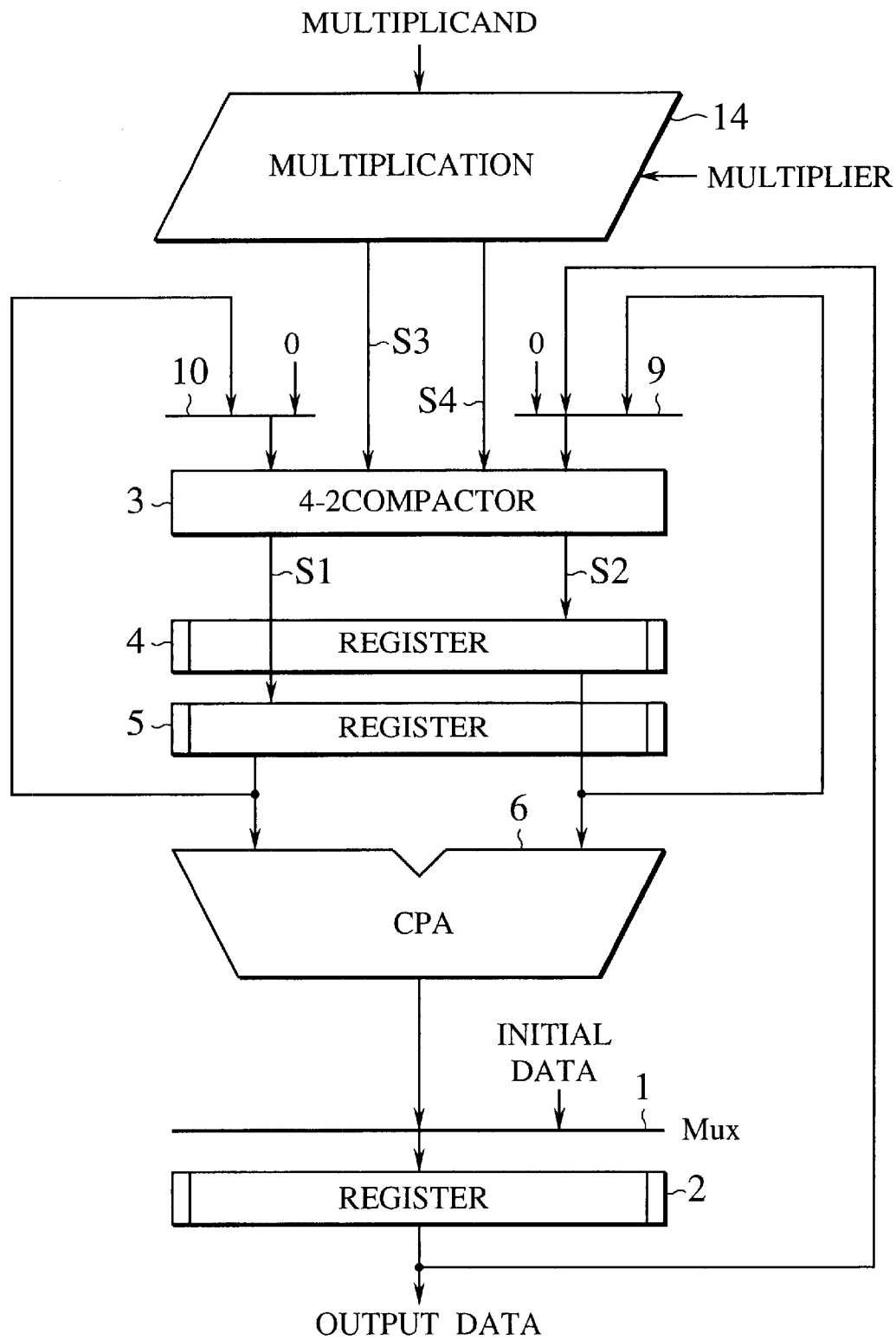
FIG. 9 is an exemplary circuit diagram showing the multiplication and accumulative addition circuit in accordance with the third embodiment of the present invention.

FIG. 9 is an exemplary circuit diagram showing the multiplication and accumulative addition circuit in accordance with the third embodiment of the present invention. The multiplication and accumulative addition circuit comprises a multiplication circuit 14, a selector circuit (multiplexer) 1, an output register 2, selectors 9 and 10, a 4-2 compactor, intermediate result latching registers 4 and 5, and the CPA 6. The multiplication circuit receives a multiplicand and a multiplier and outputs data Cm and data Sm as carries and sums. The 4-2 compactor serves to add up the input data operands Cm and Sm as output from the multiplication circuit 14, the output of the selector 9 and the output of the selector 10 together in order to generate two output results, i.e., the sums and the carries of the addition. The intermediate result latching register 4 serves to latch the carries as output from the 4-2 compactor while the intermediate result latching register 5 serves to latch the sums as output from the 4-2 compactor. The CPA 6 receives the sums and the carries as output from the 4-2 compactor through the intermediate result latching registers 4 and 5, adds up them together and outputs the result of the addition. The selector circuit 1 serves to select data to be loaded on to the output register 2 from arbitrary initial data externally supplied and the output of the CPA 6. The selector 9 receives all zero data, the data as latched on to the register 2 and the data as latched on to the intermediate result latching register 4 and selectively outputs either of them. The selector 10 receives all zero data and the data as latched on to the intermediate result latching register 5 and selectively outputs either of them.

Meanwhile, the circuit for outputting the two output results is also not limited to the 4-2 compactor in the same manner as the first and second embodiments of the present invention.

The operation of the arithmetic circuit in accordance with the third embodiment of the present invention as illustrated above will be explained in the following, with $(Sm_0, Cm_0)$ as initial multiplication results, $(Sm_1, Cm_1)$ as second multiplication results, $(Sm_2, Cm_2)$ as third multiplication results, and so forth.

(Machine Cycle 1)

First of all, initial data is selected by the selector circuit 1 and written to the register 2 in order to load the initial data for the multiplication and addition.

(Machine Cycle 2)

In the next cycle, the selector circuit 9 selects the initial data as latched on to the register 2 and outputs the initial data to the 4-2 compactor while the multiplication circuit 14 performs the multiplication of (a multiplicand$\times$a multiplier) and outputs carry data $Cm_0$ and sum data $Sm_0$ to the 4-2 compactor. Also, the selector circuit 10 selects all zero data. The carry data $Cm_0$, the sum data $Sm_0$, the output of the selector circuit 9 and the output of the selector circuit 10 are added up together in order to generate two output results, which are then latched on to the intermediate result latching registers 4 and 5 respectively. At this time, the following operation has been conducted.

$$(P+Cm_0+Sm_0)$$

(Machine Cycle 3)

Next, the CPA 6 performs the addition of data as latched on to the register 4 and the register 5. The result of the addition as calculated by the CPA 6 is selected by the selector circuit 1 and written to the output register 2.

At the same time, the selector 9 selects the output of the register 4 and output it to the 4-2 compactor. On the other hand, the selector 10 selects the output of the register 5 and output it to the 4-2 compactor in the same manner.

Also, in the same cycle, the next sum data $Sm_1$ and the next carry data $Cm_1$ are calculated by the multiplication circuit 14 and input to the 4-2 compactor 3 and added up together with the outputs of the selector 9 and the selector 10. The two results of the addition in this cycle are latched on to the registers 4 and 5 respectively.

The results of the multiplication and accumulative addition are then latched on to the registers 4 and 5 in the form of carries and sums of the following result of the accumulative addition.

$$(P+Cm_0+Sm_0+Cm_1+Sm_1)$$

The multiplication and accumulative addition is then repeated by repeating the machine cycle 3 for predetermined times in order to obtain the result in the register 2.

Accordingly, the final result of the multiplication and accumulative addition can be extracted from the output register 2.

While the initial data is used for initiating the multiplication and accumulative addition in the above described explanation, it may be appropriate to perform multiplication in the multiplication circuit 14 with an appropriate multiplicand and an appropriate multiplier at the first operation.

In this case, the multiplication is performed in the machine cycle 1 while the selectors 9 and 10 select all zero data respectively. The two results of the multiplication in this cycle are latched on to the registers 4 and 5 respectively. Then, the operation in the machine cycle 3 is repeated as explained above.

Of course, it is possible to perform a single multiplication operation by the use of this arithmetic circuit. Namely, in the case that a single multiplication operation is required rather than the multiplication and accumulative addition, both the selector 9 and the selector 10 does not select the outputs of the intermediate result latching registers 4 and 5 but does select all zero data.

Accordingly, in the case that the multiplication operation is not required, all zero data is not input to the selector 9 so that a more simple structure can be used for the selector 9. It becomes therefore possible to reduce the scale of integration by designing a single circuit capable of performing either of the multiplication and accumulative addition and the multiplication operation.

The multiplication and accumulative addition in accordance with the third embodiment of the present invention has the advantages as explained in the first and second embodiments. And, in addition to this, the multiplication operation and the associative accumulative addition can be performed in the same cycle. For this reason, the pipelined control becomes effective.

The Fourth Embodiment

In the following explanation, a multiplication and accumulative subtraction circuit in accordance with a fourth embodiment will be explained in details with reference to figures. In this case, redundant description which is common to those of the third embodiment will be dispensed with.

In this embodiment of the present invention, the intermediate results in the previous cycle are utilized for the multiplication and accumulative subtraction. The multiplication and accumulative subtraction is performed with the result of the multiplication as a subtrahend.

First of all, the equation corresponding to the operation to be performed in the fourth embodiment of the present invention will be explained. In this embodiment of the present invention, the operations corresponding the following equation is performed.

(Initial Data/Result of Multiplication)−(Multiplicand $A_0$×Multiplier $B_0$)−(Multiplicand $A_1$×Multiplier $B_1$)− ... (Multiplicand $A_n$×Multiplier $B_1$)

The first term may be either a predetermined initial data or the output result of multiplication as obtained by the multiplication circuit.

In the case that each subtrahend is subtracted from the initial data, the operation is equivalent to that of the second embodiment of the present invention as illustrated in Equation (1) except that each subtrahend is obtained from the multiplication circuit. On the other hand, in the case that each subtrahend is subtracted from the result of multiplication, the operation is as illustrated in the following equation.

$$Sm_0 + Cm_0 - (Sm_1 + Cm_1) - (Sm_2 + Cm_2) - (Sm_3 + Cm_3) \ldots - (Sm_n + Cm_n) = \quad (2)$$

$$\overline{Sm_0} + \overline{Cm_0} + Sm_1 + Cm_1 + Sm_2 + Cm_2 + Sm_3 + Cm_3 + \ldots Sm_n + Cm_n + 1$$

In this equation, carry data $Cm_0$ and sum data $Sm_0$ designate the results of the initial multiplication while $(Sm_1,Cm_1)$, $(Sm_2,Cm_2)$ ... $(Sm_n,Cm_n)$ designate carry data and sum data of the subsequent results of repeating multiplication respectively. Accordingly, as understood from the equation (2), input data $Sm_1$ and input data $Cm_1$ is added to the inversion of carry data $Cm_0$ and sum data $Sm_0$ as the results of the initial multiplication, then input data $Sm_2$ and input data $Cm_2$ is added to the previous result of the addition, and then repeating the similar operation with the input data $Smi(i=3$ to n) and the input data $Cmi(i=3$ to n). The final result of the multiplication and accumulative subtraction can be obtained from the $CPA_2$ by adding last sums to last carries and further by adding "1". to the result of the addition, and then inverting the result thereof. In this case, the additional "1" can be added as a carry-in signal of "1" supplied to the least significant bit of the CPA.

Figure 10:
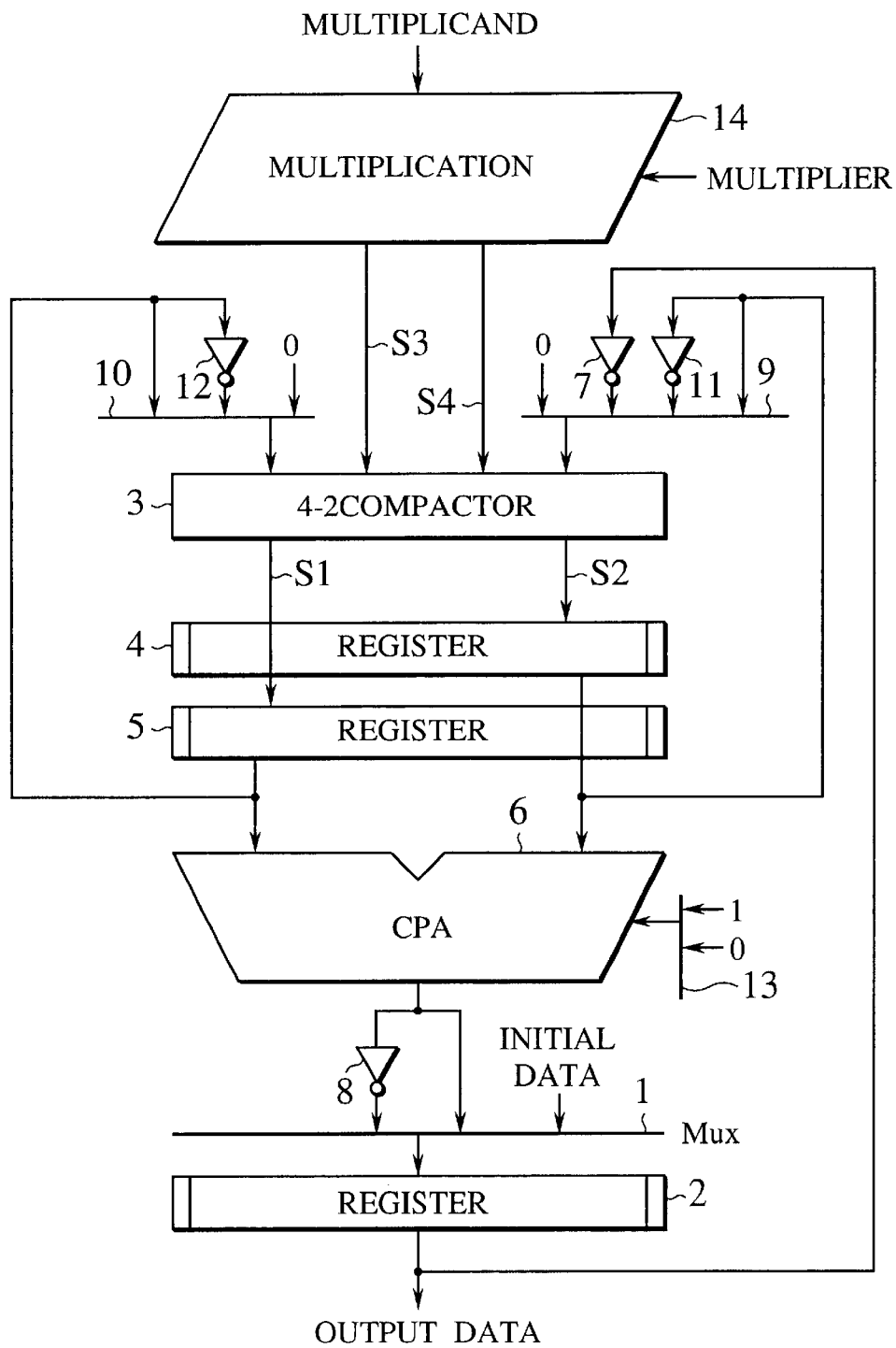
FIG. 10 is a circuit block diagram showing the multiplication and accumulative subtraction circuit in accordance with the fourth embodiment of the present invention.

FIG. 10 is a circuit block diagram showing the multiplication and accumulative subtraction circuit in accordance with the fourth embodiment of the present invention. The multiplication and accumulative subtraction circuit comprises a multiplication circuit 14, a selector circuit (multiplexer) 1, an output register 2, inverters 7, 8, 11 and 12, a selector 13, selectors 9 and 10, a 4-2 compactor, intermediate result latching registers 4 and 5, and the CPA 6.

The multiplication circuit 14 receives a multiplicand and a multiplier and outputs data Cm and data Sm as carries and sums.

The 4-2 compactor 3 receives output results of the multiplication circuit 14, i.e., carry data Cm and sum data Sm, and the outputs of the selector 9 and the selector 10, and outputs two data components S1 and S2, i.e., sums and carries.

The intermediate result latching register 4 serves to latch the carries as output from the 4-2 compactor while the intermediate result latching register 5 serves to latch the sums as output from the 4-2 compactor.

The CPA 6 receives the sums and the carries as output from the 4-2 compactor through the intermediate result latching registers 4 and 5, adds up them together. The inverter 8 is connected to the CPA 6 for inverting output data of the CPA 6 and outputs the inverted data to the selector 1.

The selector 10 receives an initial data and connected to the inverter 8, the CPA 6 and the register 2 and output to the register 2 either of the initial data, the output of the CPA 6 and the output of the inverter 12.

The selector 10 receives all zero data, the data as latched on to the intermediate result latching register 5 and, through the inverter 8, the inversion of the data as latched on to the intermediate result latching register 5, and selectively outputs either of them.

The selector 9 receives all zero data, the inversion of the data as latched on to the register 2 through the inverter 7, the data as latched on to the intermediate result latching register 4 and, through the inverter 11, the inversion of the data as latched on to the intermediate result latching register 4, and selectively outputs either of them.

The selector 13 is connected to the carry-in terminal of the CPA 6 at the least significant bit position, receives a "0" signal and a "1" signal and selectively outputs either of them.

Meanwhile, the circuit for outputting the two output results is also not limited to the 4-2 compactor in the same manner as the first and second embodiments of the present invention. Namely, two carry save adders as combined in two stages can be used to replace the 4-2 compactor. Also, the addition circuits as implemented within the multiplication circuit can be modified and appropriately combined in order to perform the required operation for outputting two output results in the form of carries and sums.

The operation of the arithmetic circuit in accordance with the third embodiment of the present invention as illustrated above will be explained in the following.

(1) Each Subtrahend is Subtracted from the Initial Data:
(Machine Cycle 1)

First of all, initial data is selected by the selector circuit 1 and written to the register 2 in order to load the initial data for the multiplication and subtraction.
(Machine Cycle 2)

In the next cycle, the selector circuit 9 selects the inversion of the initial data as latched on to the register 2 and inverted by the inverter 7 and outputs the inversion of the initial data to the 4-2 compactor while the multiplication circuit 14 performs the multiplication of (a multiplicand×a multiplier) and outputs carry data $Cm_1$ and sum data $Sm_1$ to the 4-2 compactor. Also, the selector circuit 10 selects all zero data. The 4-2 compactor then performs the addition of the carry data $Cm_1$, the sum data $Sm_1$, the output of the selector 9 and the output of the selector 10.

The outputs of the 4-2 compactor are then latched on to the intermediate result latching registers 4 and 5 respectively.

At this time, the following operation has been conducted.

$$(\overline{P}+Sm_1+Cm_1)$$

(Machine Cycle 3)

Next, the CPA 6 performs the addition of data as latched on to the register 4 and the register 5. In this case, the selector 13 selects a "0" signal, which is then input to the CPA 6. The inverter 8 outputs the inversion of the result of the addition as input from the CPA 6, and the selector 1 selects the inversion of the result of the addition. The result corresponding to the following equation is written to the output register 2.

$$\overline{(\overline{P} + Sm_1 + Cm_1)}$$

At the same time, the selector 9 selects the output of the intermediate result latching register 4, which is then input to the 4-2 compactor. Also, the selector 10 selects the output of the intermediate result latching register 5, which is then input to the 4-2 compactor.

Furthermore, in the same cycle, the next multiplication instruction is executed by the multiplication circuit 14 in order to generate carry data $CM_2$ and sum data $Sm_2$, which is then input to the 4-2 compactor. The results of the addition performed by the 4-2 compactor as illustrated in the following equation are saved in the intermediate result latching register 4 and the intermediate result latching register 5 respectively.

$$(\overline{P}+Sm_1+Cm_1+Cm_2+Sm_2)$$

The multiplication and accumulative subtraction is then repeated by repeating the machine cycle 3 for predetermined times in order to obtain the result in the register 2, from which any intermediate result can be extracted as well as the final result.

Of course, it is possible to perform a single multiplication operation by the use of this arithmetic circuit in the same manner as the third embodiment of the present invention. In this case, both the selector 9 and the selector 10 do not select the outputs of the intermediate result latching registers 4 and 5 but do select all zero data. Also, the selector 13 selects "0" as the carry-in signal to the CPA 6. Accordingly, the function for performing the multiplication and accumulative subtraction and the function for performing the multiplication operation are implemented within the same circuit so that it is possible to reduce the scale of integration.

In the case that the multiplication operation is not required, all zero data is not input to the selector 9 so that a more simple structure can be used for the selector 9.

Furthermore, in the case that each subtrahend is not subtracted from the result of multiplication as explained the following description (2) but only subtracted from the initial data as explained the following description (1), there are not required the inversion of the output of the intermediate result latching register 4 through the inverter 11, the inversion of the output of the intermediate result latching register 5 through the inverter 1.2, and the carry-in signal from the selector 13.

(2) Each Subtrahend is Subtracted from the Results of Multiplacation

In this case, an initial multiplication instruction is executed in accordance with Equation (2), followed by successively subtracting the result of subsequent multiplication instructions from the result of the initial multiplication instruction.
(Machine Cycle 1.)

The selector circuit 9 and the selector 10 select all zero data respectively and output all zero data to the 4-2 compactor, while the multiplication circuit 14 performs the multiplication of (a multiplicand×a multiplier) and outputs carry data $Cm_0$ and sum data $Sm_0$ to the 4-2 compactor. The outputs of the 4-2 compactor are then latched on to the intermediate result latching registers 4 and 5 respectively. The outputs of the 4-2 compactor are then latched on to the intermediate result latching registers 4 and 5 respectively. The two outputs $Sm_0'$ and $Cm_0'$ of the 4-2 compactor 3 is as follows.

$$Sm_0'+Cm_0'=Sm_0+Cm_0$$

Accordingly, Equation (2) is replaced by $$\overline{Sm_0' + Cm_0' + Sm_1 + Cm_1 + Sm_2 + Cm_2 + Sm_3 + Cm_3 + \ldots + Sm_n + Cm_n + 1}.$$

At this time, the following operation has been conducted.

$$(Sm_0+Cm_0)$$

(Machine Cycle 2)

Next, the CPA 6 performs the addition of data as latched on to the register 4 and the register 5. The selector 13 selects a "0" signal, which is then input to the CPA 6. The result of the addition by the CPA 6 is selected by the selector 1 and outputted to the output register 2. Namely, the result of multiplication ($Cm_0+Sm_0$) is stored in the output register 2.

At the same time, the multiplication circuit 14 performs the next multiplication of (a multiplicand×a multiplier) and outputs carry data $Cm_1$ and sum data Sm, to the 4-2 compactor.

The inverter 11 serves to invert the data as saved in the intermediate result latching register 4, and the selector 9 selects the inversion of the data. On the other hand, the inverter 12 serves to invert the data as saved in the intermediate result latching register 5, and the selector 10 selects the inversion of the data. The 4-2 compactor then performs the addition of the carry data $Cm_1$, the sum data $Sm_1$, the output of the selector 9 and the output of the selector 10. The outputs of the 4-2 compactor are then latched on to the intermediate result latching registers 4 and 5 respectively. At this time, the following operation has been conducted.

$$(\overline{Cm_0'} + \overline{Sm_0'} + Cm_1 + Sm_1)$$

(Machine Cycle 3)

Next, the CPA 6 performs the addition of data as latched on to the register 4 and the register 5. In this case, the selector 13 selects a "1" signal as a carry-in signal, which is then input to the CPA 6. The result of the addition as calculated by the CPA 6 is inverted by the inverter 8, selected by the selector circuit 1 and written to the output register 2.

$$\overline{(Cm_0' + Sm_0' + Cm_1 + Sm_1 + 1)}$$

At the same time, the selector 9 selects the output of the register 4 and output it to the 4-2 compactor. On the other hand, the selector 10 selects the output of the register 5 and output it to the 4-2 compactor in the same manner.

Furthermore, in the same cycle, the next sum data $Sm_2$ and the next carry data $Cm_2$ are calculated by the multiplication circuit 14 and input to the 4-2 compactor 3 and added up together with the outputs of the selector 9 and the selector 10. The two results of the addition in this cycle are latched on to the registers 4 and 5 respectively.

$$(\overline{Cm_0'} + \overline{Sm_0'} + Cm_1 + Sm_1 + Cm_2 + Sm_2)$$

The multiplication and accumulative subtraction is then repeated by repeating the machine cycle 3 for predetermined times in order to obtain the result in the register 2, from which any intermediate result can be extracted as well as the final result in accordance with the equation (2).

The multiplication and accumulative subtraction in accordance with the third embodiment of the present invention has the advantages as explained in the first and second embodiments. And, in addition to this, the multiplication operation and the associative accumulative subtraction can be performed in the same cycle. For this reason, the pipelined control becomes effective.

Furthermore, the multiplication and accumulative subtraction circuit in accordance with the fourth embodiment of the present invention has all the functions as implemented in the previous embodiments of the present invention. Namely, the multiplication and accumulative subtraction circuit in accordance with the fourth embodiment of the present invention is capable of performing accumulative addition, accumulative subtraction and multiplication and accumulative addition in addition to the multiplication and accumulative subtraction. It becomes therefore possible to reduce the scale of integration by designing a single circuit capable of performing the respective functions.

The equation (2) for subtraction from the result of multiplication makes it possible to effectively perform the multiplication and accumulative subtraction. Contrary to this, in accordance with the prior art technique, undesirable idling stages occurring in the pipeline is inevitable because the complement of each intermediate result is taken for use in the next operation cycle. However, in the case of the fourth embodiment of the present invention, a complement is taken only at the final stage of the accumulative operation rather than at each cycle of accumulation, resulting in a high operational performance, so that this improvement is effective to not only the accumulative operation but also a simple accumulative subtraction operation.

This is because intermediate results is used for next stage of operation as compared to the conventional procedure that the subtraction is executed only after calculation of the minuend, i.e., the result of multiplication, is completed.

Meanwhile, in the case that each subtrahend is not subtracted from the initial data, there is no need for transmission from the output register 2 to the selector 9 in accordance with the fourth embodiment of the present invention.

The Fifth Embodiment

In the following explanation, an accumulative subtractor in accordance with a fifth embodiment will be explained in details with reference to FIG. 11. In this case, redundant description which is common to that of the first embodiment will be dispensed with.

In this embodiment of the present invention, the intermediate results in the previous cycle are utilized for the accumulative subtraction.

First of all, the equation corresponding to the operation to be performed in the fifth embodiment of the present invention will be explained.

In this embodiment of the present invention, the operations corresponding the following equation is performed.

(Input Data $A_0$+Input Data $B_0$)−(Input Data $A_1$+Input Data $B_1$)− . . . (Input Data $A_n$+Input Data $B_n$)

When input data of $(A_0,B_0)$, $(A_1,B_1)$, . . . $(An,Bn)$ are sequentially input to the 4-2 compactor, the following equation is established.

$$(A_0 + B_0) - (A_1 + B_1) - (A_2 + B_2) \ldots - (A_n + B_n) = \overline{\overline{A_0} + \overline{B_0} + A_1 + B_1 + A_2 + B_2 + \ldots A_n + B_n} \quad (3)$$

Accordingly, the input data $A_1$ and the input data $B_1$ are added to the inversion of the initial addition of the input data $A_0$ and the input data $B_0$, then the input data $A_2$ and the input data $B_2$ are added to the previous result of the addition, and then repeating the similar operation with the input data $Ai(i=3$ to $n)$ and the input data $Bi(i=3$ to $n)$.

The final result of the multiplication and accumulative subtraction can be obtained from the $CPA_2$ by adding last sums to last carries and further by adding "1" to the result of the addition, and then inverting the result thereof. In this case, the additional "1" can be added as a carry-in signal of "1" supplied to the least significant bit of the CPA.

Figure 11:
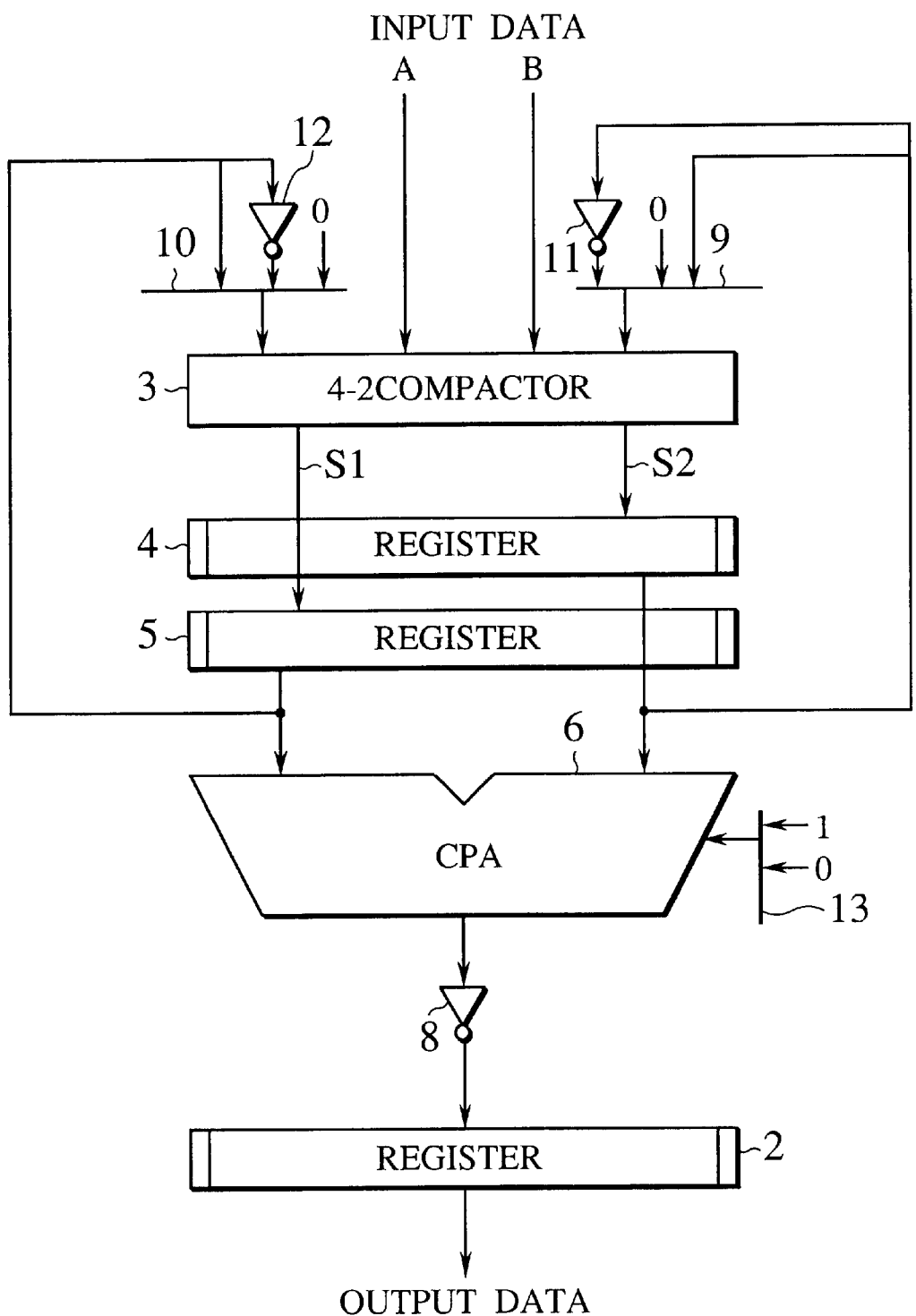
FIG. 11 is a circuit block diagram showing the multiplication and accumulative subtraction circuit in accordance with the fifth embodiment of the present invention.

FIG. 11 is a circuit block diagram showing the accumulative subtractor in accordance with the fifth embodiment of the present invention. As illustrated in FIG. 11, there are provided a zero input for a selector 9 and a selector 13.

Namely, the accumulative subtractor comprises an output register 2, inverters 8, 11 and 12, selectors 9 and 10, a 4-2 compactor 3, intermediate result latching registers 4 and 5, a selector 13 and the CPA 6. The 4-2 compactor serves to add up the input data operands Ai and Bi, the output of the selector 9 and the output of the selector 10 together in order to generate two output results, i.e., the sums and the carries. The intermediate result latching register 4 serves to latch the carries as output from the 4-2 compactor while the intermediate result latching register 5 serves to latch the sums as output from the 4-2 compactor. The CPA 6 receives the sums and the carries as output from the 4-2 compactor through the intermediate result latching registers 4 and 5, adds up them together and outputs the result of the addition. The inverter 8 is connected to the CPA 6 and serves to invert the result of the addition. The selector 9 receives the data as latched on to the register 4 and inverted by the inverter 11, the data as latched on to the intermediate result latching register 4 and all zero data and selectively outputs either of them. The selector 10 receives all zero data, the data as latched on to the intermediate result latching register 5 and inverted by the inverter 12 and the data as latched on to the intermediate result latching register 5 selectively outputs either of them. The selector 13 is connected to the carry-in terminal of the CPA 6 at the least significant bit position, receives a "0" signal and a "1" signal and selectively outputs either of them.

Meanwhile, the circuit for outputting the two output results is also not limited to the 4-2 compactor in the same manner as the previous embodiment of the present invention. The operation of the arithmetic circuit as illustrated above will be explained in the following.

(Machine Cycle 1)

The selector circuit 9 and the selector 10 select all zero data respectively and output all zero data to the 4-2 compactor, followed by addition of $A_0+B_0$ in the 4-2 compactor 3. The results of the addition as follows are stored in the intermediate result latching means 4 and 5.

$$Sm_0 + Cm_0 = A_0 + B_0$$

The Equation (3) is then rearranged as follows.

$$\overline{Sm_0} + \overline{Cm_0} + A_1 + B_1 + A_1 + B_2 + \ldots A_n + B_n$$

(Machine Cycle 2)

Next, the CPA 6 performs the addition of data as latched on to the register 4 and the register 5. At this time, the selector 13 selects a "0" signal, which is then input to the CPA 6. Also, in the same time, the result of the addition by the CPA 6 is inverted by the inverter 8 and outputted to the output register 2 while the next input data operand Al and the next input data operand B1 are input to the 4-2 compactor. The inverter 11 serves to invert the data as saved in the intermediate result latching register 4, and the selector 9 selects the inversion of the data. On the other hand, the inverter 12 serves to invert the data as saved in the intermediate result latching register 5, and the selector 10 selects the inversion of the data. The input data operand A, the input data operand B, the output of the selector circuit 9 and the output of the selector circuit 10 are then added up together in order to generate two output results, which are then latched on to the intermediate result latching registers 4 and 5 respectively.

$$(\overline{Sm_0} + \overline{Cm_0} + A_1 + B_1)$$

(Machine Cycle 3)

Next, the CPA 6 performs the addition of data as latched on to the register 4 and the register 5. In this case, the selector 13 selects a "1" signal as a carry-in signal, which is then input to the CPA 6. The result of the addition as calculated by the CPA 6 is inverted by the inverter 8 and written to the output register 2.

$$\overline{(Sm_0 + Cm_0 + A_1 + B_1 + 1)}$$

At the same time, the selector 9 selects the output of the register 4 and output it to the 4-2 compactor. On the other hand, the selector 10 selects the output of the register 5 and output it to the 4-2 compactor in the same manner. Also, in the same cycle, the next input data operands $A_2$ and $B_2$ are input to the 4-2 compactor 3 and added up together with the outputs $A_1$ and $B_1$ of the selector 9 and the selector 10 as in the following equation.

$$(\overline{Sm_0} + \overline{Cm_0} + A_1 + B_1 + A_2 + B_2)$$

The accumulative subtraction operation is then repeated by repeating the machine cycle 3 for predetermined times in which the result of the addition of each pair of input data operands is successively subtracted from the initial addition in sequence.

There are additional advantages of this embodiment of the present invention as compared to the first and second embodiments. Namely, in accordance with this embodiment, the subtraction operation is initiated even before completion of the initial addition.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An arithmetic circuit for accumulative operation comprising:

a first addition circuit for receiving and adding a plurality of input data operands and outputting two outputs of intermediate data of the addition; and intermediate result latching means for receiving and latching said two outputs of intermediate data as first and second intermediate results, wherein in the case that the plurality of input data operands are added up together and subtracted from initial data given as a minuend, the inversion of said initial data is given to said first addition circuit and added up together with the input data operands as externally supplied, and the two outputs of intermediate data are latched on to said intermediate result latching means, and wherein in the case that the plurality of input data operands are added up together and subtracted from the results of the previous operation as a minuend, the two outputs of intermediate data of the addition calculated by said first addition circuit and latched on to said intermediate result latching means are supplied to said first addition as two of said input data operands for next accumulative operation to be conducted by said first addition circuit, and the accumulative operation is repeated for predetermined times while the result of accumulative subtraction is obtained by adding up together the two outputs of intermediate data and inverting the result of the addition.

2. An arithmetic circuit for accumulative operation as claimed in claim 1 further comprising:

a second addition circuit connected to said intermediate result latching means for adding up said first and second intermediate results as latched on to said intermediate result latching means and outputting a result of addition;

a first inverter connected to said second addition circuit for inverting output data of said second addition circuit;

a second inverter for outputting the inversion of arbitrary initial data;

a second selector for selectively outputting to said first addition circuit either of said first intermediate result or the inversion of the inversion of arbitrary initial data;

wherein the two outputs of intermediate data of the addition calculated by said first addition circuit and latched on to said intermediate result latching means are supplied to said first addition as two of said input data operands for next accumulative operation to be conducted by said first addition circuit.

3. An arithmetic circuit for accumulative operation as claimed in claim 1 further comprising:

a third selector connected to said first addition circuit and another of said intermediate result latching means for selectively outputting to said first addition circuit either of said second intermediate result or all zero data.

4. An arithmetic circuit for accumulative operation comprising:

an addition circuit for receiving and adding a plurality of input data operands and outputting two outputs of intermediate data of the addition; and intermediate result latching means for receiving and latching said two outputs of intermediate data as first and second intermediate results, wherein the plurality of input data operands are supplied to be added up together by said addition circuit and the two outputs of intermediate data are latched on to said intermediate result latching means, wherein the inversion of the two outputs of intermediate data of the addition calculated by said first addition circuit and latched on to said intermediate result latching means are supplied to said addition circuit and added up together with the plurality of input data operands supplied as a subtrahend, and the result of the addition is latched on to said intermediate result latching means, and wherein the two outputs of intermediate data of the addition latched on to said intermediate result latching means are added up, and the result is incremented by 1 and inverted to obtain the final result of the operation.

5. An arithmetic circuit for accumulative operation as claimed in claim 4 wherein in the case that the plurality of input data operands are added up together and subtracted from the results of the previous operation as a minuend, the two outputs of intermediate data latched on to said intermediate result latching means are supplied to said addition circuit and added up together with the plurality of input data operands as a minuend, and the accumulative operation is repeated for predetermined times while the result of accumulative subtraction is obtained by adding up together the two outputs of intermediate data and incrementing the result by 1 and inverted to obtain the final result of the operation.

6. An arithmetic circuit for accumulative operation comprising:

a multiplication circuit for generating a multiplication result of a multiplier and a multiplicand in the form of sums and carries;

a first addition circuit for receiving and adding a plurality of input data operands including said sums and said carries and outputting two outputs of intermediate data of the addition; and intermediate result latching means for receiving and latching said two outputs of intermediate data as first and second intermediate results, wherein, in the case that initial data is given as a minuend, the inversion of arbitrary initial data is supplied to said first addition circuit and added up together with sums and carries as supplied from said multiplication circuit, and the two outputs of said first addition circuit are latched on to said intermediate result latching means as first and second intermediate results, wherein, in the case that subtraction is repeated, said first and second intermediate results as latched on to said intermediate result latching means are supplied to said first addition circuit as two of said input data operands for next operation and repeating the supply to said first addition circuit, and wherein the result of accumulative subtraction is obtained by adding up together the two outputs of intermediate data and inverting.

7. An arithmetic circuit for accumulative operation as claimed in claim 6 further comprising:

a first inverter connected to said second addition circuit for inverting output data of said second addition circuit;

a first selector receiving an initial data and connected to said first inverter for selectively outputting either of said initial data or the inversion of the output data of said second addition circuit as inverted by said first inverter;

resultant data latching means connected to said first selector for latching either of said initial data or the inversion of the output data of said second addition circuit as inverted by said first inverter;

a second inverter connected to said resultant data latching means for outputting the inversion of the output data of resultant data latching means;

a third inverter connected to one of said intermediate result latching means for outputting the inversion of said first intermediate result;

a second selector connected to said first addition circuit, said second inverter, said third inverter and one of said intermediate result latching means for selectively outputting to said first addition circuit either of said first intermediate result, the inversion of said first intermediate result as inverted by said third inverter or the inversion of the output data of said initial data as inverted by said second inverter.

8. An arithmetic circuit for accumulative operation as claimed in claim 6 further comprising:

a fourth inverter connected to another of said intermediate result latching means for outputting the inversion of said second intermediate result;

a third selector connected to said first addition circuit and another of said intermediate result latching means for selectively outputting to said first addition circuit either of said second intermediate result, the inversion of said second intermediate result as inverted by said fourth inverter or all zero data.

9. An arithmetic circuit for accumulative operation as claimed in claim 6 further comprising:

a first inverter for inverting output data of a second addition circuit connected to said intermediate result latching means for adding up said first and second intermediate results as latched on to said intermediate result latching means and outputting a result of addition;

a second inverter for outputting the inversion of arbitrary initial data; and a second selector for selectively supplying to said first addition circuit either of the output data of one of said intermediate result latching means or the output data of said second inverter.

10. An arithmetic circuit for accumulative operation as claimed in claim 6 further comprising:
- a second addition circuit for adding up said first and second intermediate results as latched on to said intermediate result latching means and outputting a result of addition; and
- a first inverter connected to said second addition circuit for inverting output data of said second addition circuit;
- a second inverter for outputting the inversion of arbitrary initial data;
- a third inverter for outputting the inversion of said first intermediate result;
- a second selector for selectively outputting to said first addition circuit either of the inversion of arbitrary initial data, the output data of said third inverter or said first intermediate result.

11. An arithmetic circuit for accumulative operation comprising:
- a multiplication circuit for generating a multiplication result of a multiplier and a multiplicand in the form of sums and carries;
- a first addition circuit for receiving and adding a plurality of input data operands including said sums and said carries and outputting two outputs of intermediate data of the addition; and
- intermediate result latching means for receiving and latching said two outputs of intermediate data as first and second intermediate results,
- wherein the sums and carries obtained as the results of the multiplication are supplied to said first addition circuit and the two outputs of intermediate data of the addition calculated by said first addition circuit ate latched on to said intermediated result latching means, and
- wherein the two outputs of the intermidiate result latching means are inverted and supplied to said first addition circuit as two of said input data operands for next operation, the addition of the sums and carries obtained as supplied from said multiplication circuit is preformed, the two intermidiate results thereof are latched on to said intermediated result latchign means and up by said second addition ciruit, incremented by 1 and inverted to obtain the result of the multiplication and accumulatvie subtraction.

12. An arithmetic circuit for accumulative operation as claimed in claim 11 wherein in the case that the accumulative subtraction is performed with the result of the previous multiplication operation as a subtrahend and the result of the previous subtraction operation as a minuend, the two outputs as latched on to said intermediate result latching means are supplied to said first addition circuit as two of said input data operands for next accumulative operation to be conducted by said first addition circuit in place of said two inversion results and added up together with sums and carries as supplied from said multiplication circuit, and the two outputs of said first addition circuit are latched on to said intermediate result latching means followed by repetition of these procedures for predetermined times, and wherein the two outputs of intermediate data of the addition circuit latched on to said intermediate result latching means are added up, and the result is incremented by 1 and inverted to obtain the final result of the operation.

13. An arithmetic circuit for accumulative operation as claimed in claim 10 wherein the two outputs of intermediate data of the addition circuit latched on to said intermediate result latching means are added up by means of a carry propagation adder, as a second addition circuit, while the increment of 1 is performed as a carry-in signal.

14. An arithmetic circuit for accumulative operation as claimed in claim 11 further comprising:
- a first inverter connected to said second addition circuit for inverting output data of said second addition circuit;
- a first selector receiving an initial data and connected to said first inverter for selectively outputting either of said initial data or the inversion of the output data of said second addition circuit as inverted by said first inverter;
- resultant data latching means connected to said first selector for latching either of said initial data or the inversion of the output data of said second addition circuit as inverted by said first inverter;
- a second inverter connected to said resultant data latching means for outputting the inversion of the output data of resultant data latching means;
- a third inverter connected to one of said intermediate result latching means for outputting the inversion of said first intermediate result;
- a second selector connected to said first addition circuit, said second inverter, said third inverter and one of said intermediate result latching means for selectively outputting to said first addition circuit either of said first intermediate result, the inversion of said first intermediate result as inverted by said third inverter or the inversion of said initial data as inverted by said first inverter.

15. An arithmetic circuit for accumulative operation as claimed in claim 11 further comprising:
- a fourth inverter connected to another of said intermediate result latching means for outputting the inversion of said second intermediate result;
- a third selector connected to said first addition circuit and another of said intermediate result latching means for selectively outputting to said first addition circuit either of said second intermediate result, the inversion of said second intermediate result as inverted by said fourth inverter or all zero data.

16. An arithmetic circuit for accumulative operation comprising:
- a multiplication circuit for generating a multiplication result of a multiplier and a multiplicand in the form of sums and carries;
- a first addition circuit for receiving and adding a plurality of input data operands including said sums and said carries as outputs from said multiplication circuit and the inversion of said sums and said carries as a result of the previous multiplication conducted by said multiplication circuit and outputting two outputs of intermediate data of the addition circuit; and
- intermediate result latching means for receiving and latching said two outputs of intermediate data as first and second intermediate results,
- wherein the first and second intermediate results are added up together and incremented by 1 and inverted to obtain the final result of the operation.

17. An arithmetic circuit for accumulative operation capable of multiplication and accumulative addition and multiplication and accumulative subtraction comprising:
- a multiplication circuit for generating a multiplication result of a multiplier and a multiplicand in the form of sums and carries;
- a first addition circuit for receiving and adding a plurality of input data operands including said sums and said carries and outputting two outputs of intermediate data of the addition circuit; and intermediate result latching means for receiving and latching said two outputs of intermediate data as first and second intermediate results, wherein said sums and said carries as a result of initial multiplication conducted by said multiplication circuit are supplied to said first addition circuit and the two outputs of intermediate data of the addition calculated by said first addition circuit are latched on to said intermediate result latching means, wherein, in the case that the multiplication and accumulative addition is performed, the results latched on to said intermediate result latching means are supplied to said first addition circuit as two of said input data operands for next accumulative operation and added up together with sums and carries as supplied from said multiplication circuit the two outputs of said first addition circuit are latched on to said intermediate result latching means and added up together to obtain the final result of the multiplication and accumulative addition operation, and wherein, in the case that the multiplication and accumulative subtraction is performed, the results latched on to said intermediate result latching means are inverted and supplied to said first addition circuit as two of said input data operands for next accumulative operation and added up together with sums and carries as supplied from said multiplication circuit, and the two outputs of said first addition circuit are latched on to said intermediate result latching means and added up and incremented by 1 and inverted to obtain the final result of the multiplication and accumulative subtraction operation.

18. An arithmetic circuit for accumulative operation capable of multiplication and accumulative addition and multiplication and accumulative subtraction as claimed in claim 17 in the case that accumulative operation is repeated, the results latched on to said intermediate result latching means are inverted and supplied to said first addition circuit as two of said input data operands for next accumulative operation, and the two outputs of said first addition circuit are added up together and incremented by 1 and inverted to obtain the final result of the accumulative operation.

19. An arithmetic circuit for accumulative operation comprising:

a first addition circuit for receiving and adding a plurality of input data operands and outputting two outputs of intermediate data of the addition;

intermediate result latching means for receiving and latching said two outputs of intermediate data as first and second intermediate results;

a second addition circuit connected to said intermediate result latching means for adding up said first and second intermediate results as latched on to said intermediate result latching means and outputting a result of addition;

a first inverter connected to said second addition circuit for inverting output data of said second addition circuit;

a second inverter for outputting the inversion of arbitrary initial data;

a second selector for selectively outputting to said first addition circuit either of said first intermediate result or the inversion of arbitrary initial data;

wherein the two outputs of intermediate data of the addition calculated by said first addition circuit and latched on to said intermediate result latching means are supplied to said first addition as two of said input data operands for next accumulative operation to be conducted by said first addition circuit.

20. An arithmetic circuit for accumulative operation as claimed in claim 19 further comprising:

a third selector connected to said first addition circuit and another of said intermediate result latching means for selectively outputting to said second addition circuit either of said first intermediate result or all zero data.

21. An arithmetic circuit for accumulative operation comprising:

a multiplier for generating a multiplication result of a multiplier and a multiplicand in the form of sums and carries;

a first addition circuit connected to said multiplier for receiving and adding a plurality of input data operands including said sums and said carries and outputting two outputs of intermediate data of the addition;

intermediate result latching means connected to said first addition circuit for receiving and latching said two outputs of intermediate data as first and second intermediate results;

a second addition circuit connected to said intermediate result latching means for adding up said first and second intermediate results as latched on to said intermediate result latching means and outputting a result of addition;

wherein the two outputs of intermediate data of the addition calculated by said first addition circuit and latched on to said intermediate result latching means are supplied to said first addition as two of said input data operands for next accumulative operation to be conducted by said first addition circuit, wherein said first addition circuit is an addition circuit comprising a 4-2 compactor, and further comprising:

a first inverter for inverting output data of a second addition circuit connected to said intermediate result latching means for adding up said first and second intermediate results as latched on to said intermediate result latching means and outputting a result of addition;

a second inverter for outputting the inversion of arbitrary initial data; and a second selector for selectively supplying to said first addition circuit either of the output data of one of said intermediate result latching means or the output data of said second inverter.

22. An arithmetic circuit for accumulative operation comprising:

a multiplier for generating a multiplication result of a multiplier and a multiplicand in the form of sums and carries;

a first addition circuit connected to said multiplier for receiving and adding a plurality of input data operands including said sums and said carries and outputting two outputs of intermediate data of the addition;

intermediate result latching means connected to said first addition circuit for receiving and latching said two outputs of intermediate data as first and second intermediate results;

a second addition circuit connected to said intermediate result latching means for adding up said first and second intermediate results as latched on to said intermediate result latching means and outputting a result of addition;

wherein the two outputs of intermediate data of the addition calculated by said first addition circuit and latched on to said intermediate result latching means are supplied to said first addition as two of said input data operands for next accumulative operation to be conducted by said first addition circuit, wherein said first addition circuit is an addition circuit comprising a 4-2 compactor, and further comprising:
- a second addition circuit for adding up said first and second intermediate results as latched on to said intermediate result latching means and outputting a result of addition; and
- a first inverter connected to said second addition circuit for inverting output data of said second addition circuit;
- a second inverter for outputting the inversion of arbitrary initial data;
- a third inverter for outputting the inversion of said first intermediate result;
- a second selector for selectively outputting to said first addition circuit either of the inversion of arbitrary initial data, the output data of one of said intermediate result latching means or the inversion of said first intermediate result as inverted by said third inverter.

23. An arithmetic circuit for accumulative operation as claimed in claim 22 further comprising:
- a third selector for selectively supplying to said first addition circuit either of the output of another of said intermediate result latching means or all zero data.

24. An arithmetic circuit for accumulative operation as claimed in claim 22 further comprising:
- a fourth inverter for outputting the inversion of said second intermediate result; and
- a third selector connected to said first addition circuit and another of said intermediate result latching means for selectively outputting to said first addition circuit either of said second intermediate result, the inversion of said second intermediate result as inverted by said fourth inverter and all zero data.

* * * * *